US011644963B2

(12) United States Patent
Tappan et al.

(10) Patent No.: US 11,644,963 B2
(45) Date of Patent: *May 9, 2023

(54) SYSTEMS AND METHODS FOR DYNAMICALLY GROUPING DATA ANALYSIS CONTENT

(71) Applicant: Baker Hughes, a GE Company, LLC, Houston, TX (US)

(72) Inventors: Jacqueline Marie Tappan, Minden, NV (US); Ryan Gregory Roaldson, Minden, NV (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/188,150

(22) Filed: Mar. 1, 2021

(65) Prior Publication Data
US 2021/0191609 A1     Jun. 24, 2021

Related U.S. Application Data

(63) Continuation of application No. 16/024,035, filed on Jun. 29, 2018, now Pat. No. 10,956,014, which is a
(Continued)

(51) Int. Cl.
*G06F 16/00* (2019.01)
*G06F 3/00* (2006.01)
(Continued)

(52) U.S. Cl.
CPC ..... *G06F 3/04847* (2013.01); *G05B 23/0221* (2013.01); *G05B 23/0251* (2013.01);
(Continued)

(58) Field of Classification Search
CPC .. G06F 3/04847; G06F 3/0486; G06F 3/0482; G06F 3/0488; G06F 3/0484;
(Continued)

(56) References Cited

U.S. PATENT DOCUMENTS 5,109,700 A *  5/1992  Hicho ................. G01M 13/045
                                                      73/660
6,014,598 A *  1/2000  Duyar ................. G01R 31/343
                                                      701/33.9
(Continued)

FOREIGN PATENT DOCUMENTS

WO    WO2011026053 A1 *  3/2011
WO    WO 2013134067 A1 *  9/2013

OTHER PUBLICATIONS

T. Natschlager et al., "Extracting knowledge and computable models from data—needs, expectations, and experience", 2004 IEEE International Conference on Fuzzy Systems (IEEE Cat. No. 04CH37542), Jul. 2004, pp. 493-498.*
(Continued)

*Primary Examiner* — Srirama Channavajjala
(74) *Attorney, Agent, or Firm* — Mintz Levin Cohn Ferris Glovsky and Popeo, PC

(57) ABSTRACT

Systems and methods are provided for dynamically grouping data analysis content derived from a plurality of sensors. In one embodiment, a plurality of sensors can be disposed on a plurality of machine trains or one or more machines within the plurality of machine trains configured in an industrial environment. A communication circuit can be operatively coupled to the plurality of sensors and configured to communicate data measured by the plurality of sensors, and a dynamic graphical user interface (GUI) can be provided on a touchscreen display and can be configured to dynamically generate one or more visualizations of the measured data. A processor can be configured to receive the measured data via the communication circuit, to generate a plurality of measurements based on the measured data, and to operatively control the dynamic GUI in response to a grouping mode selection.

20 Claims, 21 Drawing Sheets

Related U.S. Application Data continuation-in-part of application No. 14/141,736, filed on Dec. 27, 2013, now Pat. No. 10,545,986.

(51) Int. Cl.

| | | |
|---|---|---|
| *G06F 3/04847* | (2022.01) | |
| *G06F 3/0486* | (2013.01) | |
| *G06F 3/0482* | (2013.01) | |
| *G05B 23/02* | (2006.01) | |
| *G06F 3/0488* | (2022.01) | |
| *G06F 3/0484* | (2022.01) | |
| *G06F 3/04842* | (2022.01) | |
| *G06F 16/26* | (2019.01) | |
| *G06F 16/35* | (2019.01) | |
| *G06F 16/28* | (2019.01) | |
| *G06F 16/22* | (2019.01) | |

(52) U.S. Cl.
CPC ....... *G05B 23/0272* (2013.01); *G06F 3/0482* (2013.01); *G06F 3/0484* (2013.01); *G06F 3/0486* (2013.01); *G06F 3/0488* (2013.01); *G06F 3/04842* (2013.01); *G06F 16/221* (2019.01); *G06F 16/26* (2019.01); *G06F 16/285* (2019.01); *G06F 16/287* (2019.01); *G06F 16/358* (2019.01)

(58) Field of Classification Search
CPC .. G06F 3/04842; G06F 16/221; G06F 16/287; G06F 16/285; G06F 16/26; G06F 16/358; G05B 23/0272; G05B 23/0251; G05B 23/0221
See application file for complete search history.

(56) References Cited

U.S. PATENT DOCUMENTS

| | | | | |
|---|---|---|---|---|
| 7,023,440 | B1* | 4/2006 | Havekost | G05B 23/0267 345/440 |
| 7,027,051 | B2* | 4/2006 | Alford, Jr. | G06T 17/00 345/440 |
| 7,444,265 | B2* | 10/2008 | Havela | G01M 13/045 702/183 |
| 7,962,440 | B2* | 6/2011 | Baier | G05B 19/41875 706/62 |
| 9,389,761 | B2* | 7/2016 | Roaldson | G06F 3/0482 |
| 2003/0028269 | A1* | 2/2003 | Spriggs | G06Q 10/087 700/83 |
| 2008/0097637 | A1* | 4/2008 | Nguyen | G05B 23/0254 700/110 |
| 2008/0255438 | A1* | 10/2008 | Saidara | A61B 5/14532 600/365 |
| 2009/0131776 | A1* | 5/2009 | Simpson | C12Q 1/006 600/365 |
| 2011/0201911 | A1* | 8/2011 | Johnson | A61B 5/746 345/173 |
| 2013/0112893 | A1* | 5/2013 | Miyake | G01N 23/00 250/306 |

OTHER PUBLICATIONS

Wei Tang et al., "Clustering with Multiple Graphs", 2009 Ninth IEEE International Conference on Data Mining, Dec. 2009, pp. 1016-1021.*

* cited by examiner

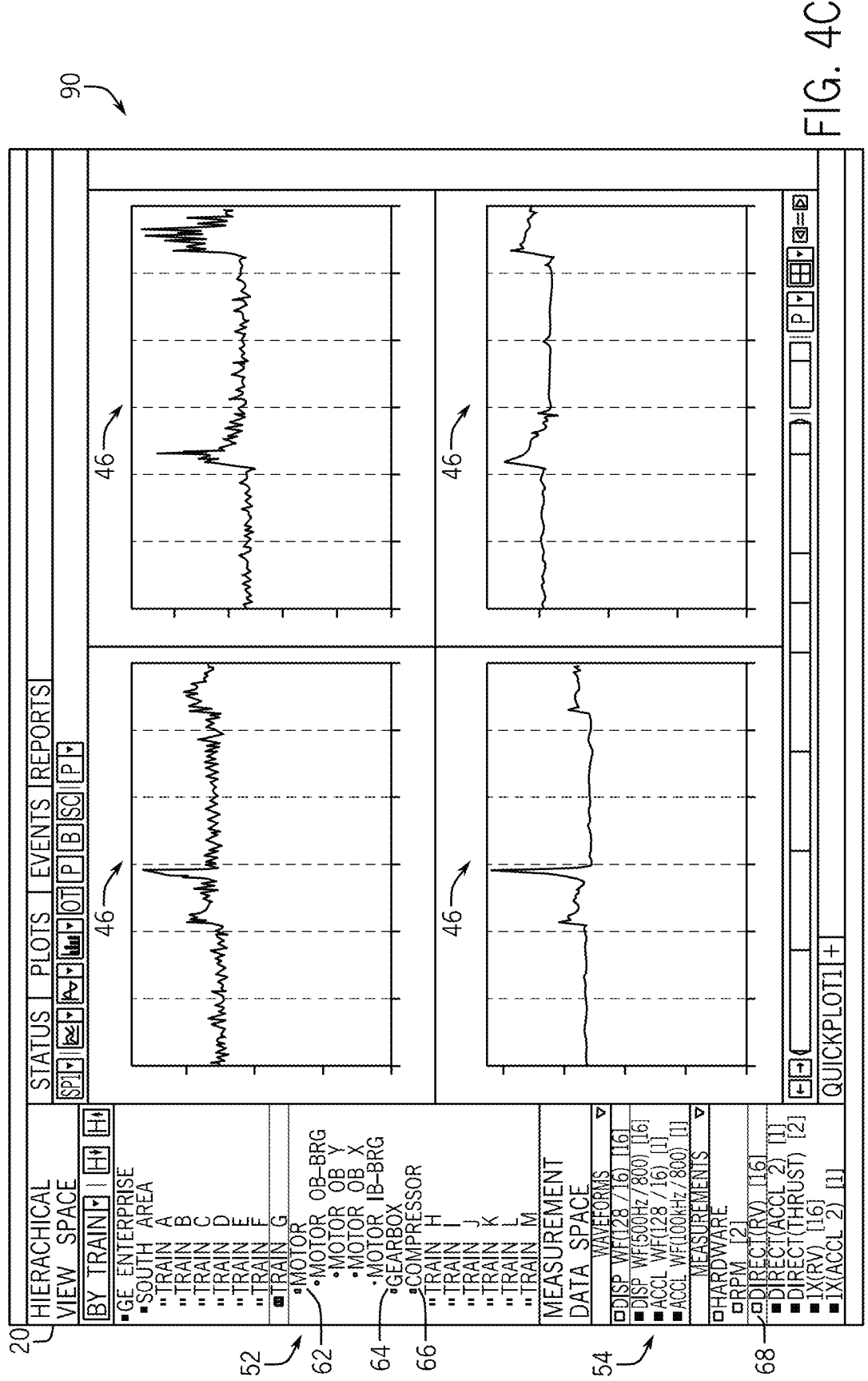

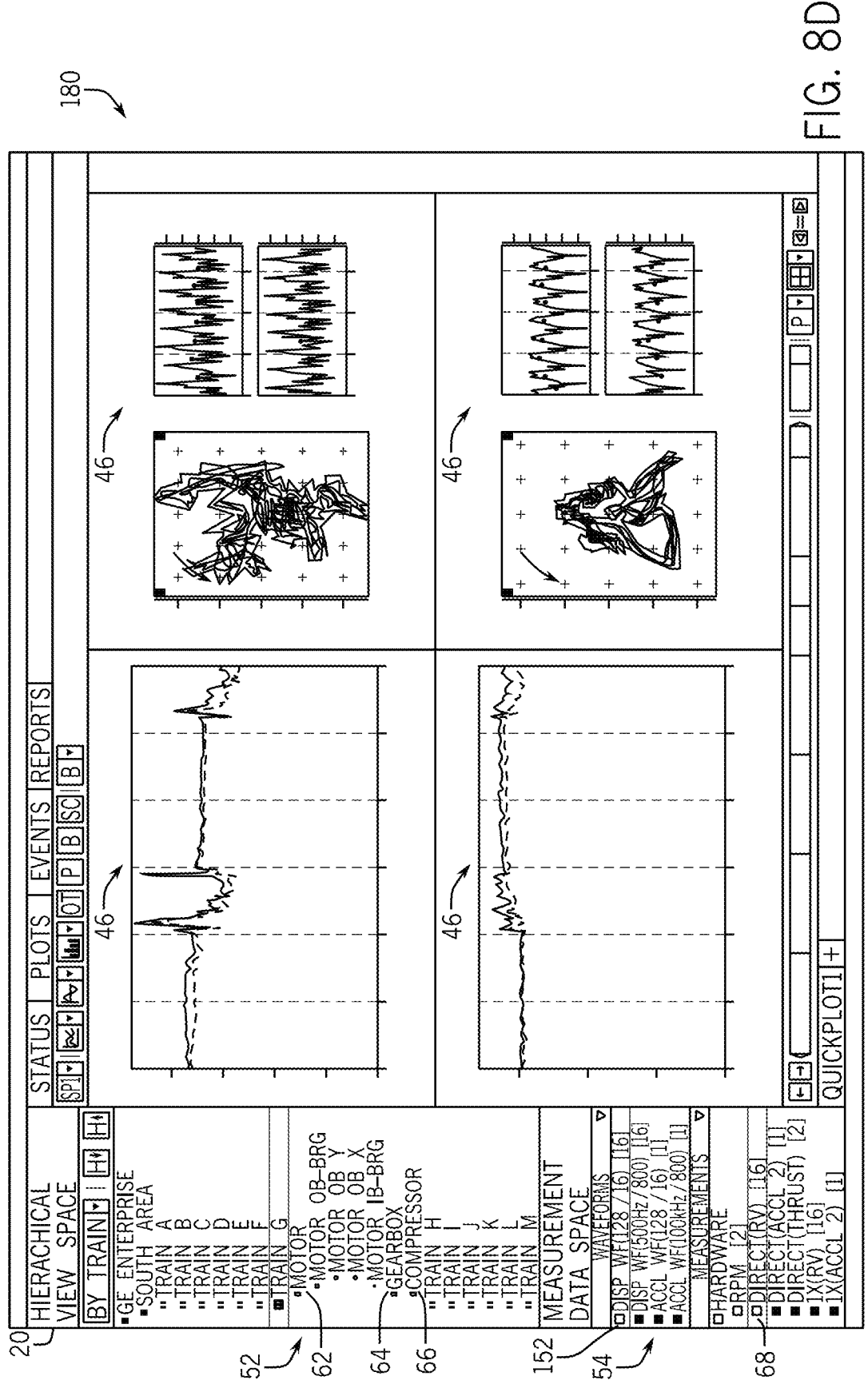

SYSTEMS AND METHODS FOR DYNAMICALLY GROUPING DATA ANALYSIS CONTENT

CROSS-REFERENCE TO RELATED APPLICATION

This application is a continuation of U.S. patent application Ser. No. 16/024,035, filed on Jun. 29, 2018 in the U.S. Patent and Trademark Office, which is a continuation-in-part of U.S. Pat. No. 10,549,986, granted on Jan. 28, 2020 by the U.S. Patent and Trademark Office, the entire contents of each of which are incorporated herein by reference.

BACKGROUND

The subject matter disclosed herein relates to systems and methods for grouping content presented on a graphical user interface (GUI) of a condition monitoring system. More specifically, the subject matter disclosed herein relates to dynamically grouping the content displayed on the GUI based on real-time input received by the GUI.

Industrial monitoring systems, such as asset condition monitoring systems, generally provide monitoring capabilities for various types of mechanical devices and systems. For example, an industrial monitor can monitor one or more operational parameters of a gas turbine system. Here, the industrial monitoring system can include a number of sensors (e.g., temperature sensors, pressure sensors, flow sensors, and so forth) disposed throughout the gas turbine system. Such sensors can provide the industrial monitoring system data related to parameters associated with the gas turbine system.

In this manner, condition monitoring systems can provide users with valuable information regarding the health or condition of various machines in an industrial environment. For instance, condition monitoring systems can receive inputs from a broad range of sources in a plant including permanent and portable condition monitoring hardware/software, process control and automation hardware/software, process historians, maintenance management and reliability software, spreadsheets, operator logs, and the like. Using the data received from these sources, users of the condition monitoring systems can analyze the data with various tools provided by the condition monitoring systems. However, due to a decreasing availability of technically inclined personnel in the general workforce of the industrial industry, it is now recognized that improved systems and methods for operating condition monitoring systems via a graphical user interface are desired.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention can encompass a variety of forms that can be similar to or different from the embodiments set forth below.

In a first embodiment, a system can include a plurality of sensors disposed on a plurality of machine trains or one or more components within the plurality of machine trains, each machine train including one or more machines configured in an industrial environment. The system can also include a computing device including a communication circuit operatively coupled to the plurality of sensors and configured to communicate data measured by the plurality of sensors. The computing device can further include a touchscreen display providing a dynamic graphical user interface (GUI) configured to dynamically generate one or more visualizations of the measured data. The computing device can further include a processor configured to receive the measured data via the communication circuit and to generate a plurality of measurements based on the measured data. The processor can operatively control the dynamic GUI so as to display a plurality of selectable objects corresponding to the plurality of machine trains as a graphical illustration depicting a physical arrangement of one or more machines included in at least one machine train of the plurality of machine trains; receive a selection of one of the plurality of selectable objects, the selection corresponding to a particular machine included in at least one machine train of the plurality of machine trains; receive a selection of a grouping mode among a plurality of predefined grouping modes specifying a machine train metric by which to group the measured data for display; display a first plurality of measurements corresponding to the measured data associated with the particular machine train from which the plurality of measurements derive in the dynamic GUI above the graphical illustration depicting the physical arrangement of the one or more machines; and a display a second plurality of measurements corresponding to the one or more machines of the particular machine train in the dynamic GUI below the graphical illustration depicting the physical arrangement of the one or more machines, the first plurality of measurements and the second plurality of measurements being automatically grouped into one or more columns in response to the selection of the grouping mode. Each measurement of the first plurality of measurements and the second plurality of measurements can derive from a particular sensor among the plurality of sensors disposed on the particular machine train or on the one or more machines of the particular machine train.

In a second embodiment, a non-transitory computer-readable medium including machine-readable instructions executable by a processor can cause the processor to receive, via a communication circuit coupled to the processor, data measured by a plurality of sensors. The plurality of sensors can be disposed on a plurality of machine trains or one or more components within the plurality of machine trains, each machine train including one or more machines configured in an industrial environment and monitored by a condition monitoring system including the processor. The processor can then generate a plurality of measurements based on the measured data. The processor can also operatively control a dynamic graphical user interface (GUI) configured to dynamically generate one or more visualization of the measured data, the dynamic GUI provided on a touchscreen display of the condition monitoring system, the dynamic GUI operatively controlled so as to: display a plurality of selectable objects corresponding to the plurality of machine trains as a graphical illustration depicting a physical arrangement of one or more machines included in at least one machine train of the plurality of machine trains; receive a selection of one of the plurality of selectable objects, the selection corresponding to a particular machine included in at least one machine train of the plurality of machine trains; receive a selection of a grouping mode among a plurality of predefined grouping modes specifying a machine train metric by which to group the measured data for display; display a first plurality of measurements corresponding to the measured data associated with the particular machine train from which the plurality of measurements derive in the dynamic GUI above the graphical illustration depicting the physical arrangement of the one or more machines; and display a plurality of second plurality of measurements corresponding to the one or more machines of the particular machine train in the dynamic GUI below the graphical illustration depicting the physical arrangement of the one or more machines, the first plurality of measurements and the second plurality of measurements being automatically grouped into one or more columns in response to the selection of the grouping mode. Each measurement of the first plurality of measurements and the second plurality of measurements can derive from a particular sensor among the plurality of sensors disposed on the particular machine train or on the one or more machines of the particular machine train.

In a third embodiment, a method can include receiving, by a processor configured in a condition monitoring system and coupled to a plurality of sensors via a communication circuit, data measured by the plurality of sensors. The plurality of sensors can be disposed on a plurality of machine trains or one or more components within the plurality of machine trains, each machine train including one or more machines configured in an industrial environment and monitored by the condition monitoring system. The method can also include generating, by the processor, a plurality of measurements based on the measured data. The method can further include operatively controlling, by the processor, a dynamic graphical user interface (GUI) configured to dynamically generate one or more visualization of the measured data, the dynamic GUI provided on a touchscreen display of the condition monitoring system, the dynamic GUI operatively controlled so as to: display a plurality of selectable objects corresponding to the plurality of machine trains as a graphical illustration depicting a physical arrangement of one or more machines included in at least one machine train of the plurality of machine trains; receive a selection of one of the plurality of selectable objects, the selection corresponding to a particular machine train included in at least one machine of the plurality of machine trains; receive a selection of a grouping mode among a plurality of predefined grouping modes specifying a machine train metric by which to group the measured data for display; display a first plurality of measurements corresponding to the measured data associated with the particular machine train from which the plurality of measurements derive in the dynamic GUI above the graphical illustration depicting the physical arrangement of the one or more machines; and display a second plurality of s measurements corresponding to the one or more machines of the particular machine train in the dynamic GUI below the graphical illustration depicting the physical arrangement of the one or more machines, the first plurality of measurements and the second plurality of measurements being automatically grouped into one or more columns in response to the selection of the grouping mode. Each measurement of the first plurality of measurements and the second plurality of measurements can derive from a particular sensor among the plurality of sensors disposed on the particular machine train or on the one or more machines of the particular machine train.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 4A-4D illustrate schematic views of a number of plots generated via the graphical user interface for the condition monitoring system of FIG. 2, in accordance with embodiments presented herein;

FIGS. 8A-8D illustrate schematic views of the plots of FIGS. 4A-4D along with additional plots depicted according to a first order mode, in accordance with embodiments presented herein;

DETAILED DESCRIPTION

Figure 1:
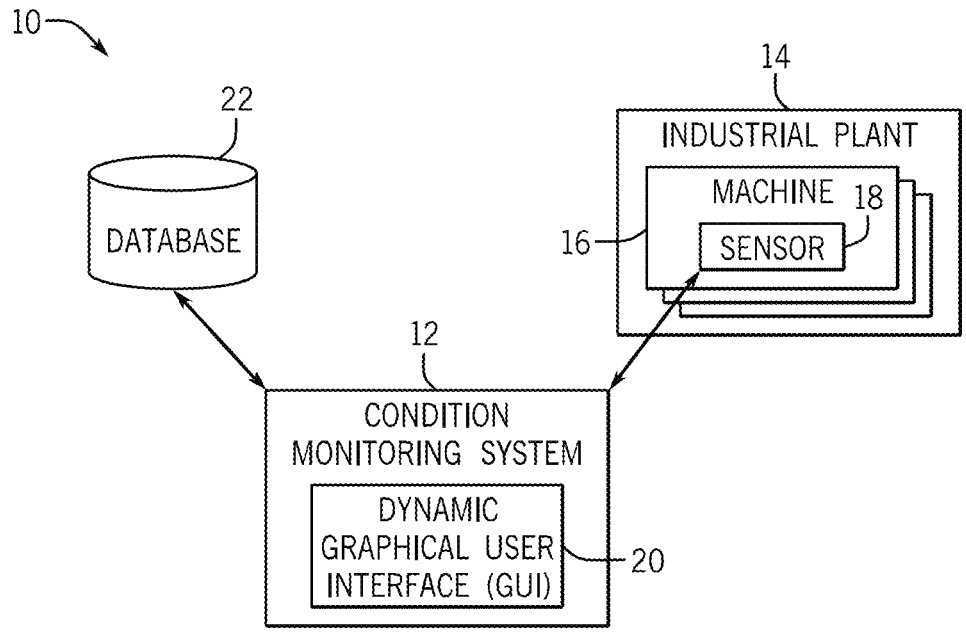
FIG. 1 illustrates a block diagram of an industrial monitoring system, in accordance with embodiments presented herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which can vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there can be additional elements other than the listed elements.

In an industrial environment, a number of machines can be operating together to perform various tasks related to gasifying a feedstock to produce syngas and/or chemicals, generating power for distribution on a power grid, operating turbine systems, mass producing a product, processing certain chemicals, and the like. Generally, each of the machines in the industrial environment can include a number of sensors attached thereto to monitor various conditions within a respective machine. For example, a plurality of sensors can be distributed in a gasification system, a turbine system, and/or a power plant to monitor temperatures, pressures, flow rates, gas compositions, vibration, clearance, torque, rotational speed, exhaust emissions, power output, flame characteristics, combustion dynamics, current, voltage, or any combination thereof. By further example, in a turbine or a motor, one sensor can measure a rotational speed of a shaft, while another sensor can measure an internal temperature. In any case, the data received by these sensors can be provided as inputs into a condition monitoring system. The condition monitoring system may, in turn, present the received data on a display in a coherent and comprehensible manner. The received data can also be processed or analyzed by the condition monitoring system using various types of data processing or analysis tools or the like. As such, if the condition monitoring system processes the received data, the condition monitoring system can present the processed data in a manner that can be further interpreted or analyzed by a user. Additionally or alternatively, the received data can be processed or analyzed using a separate analysis product, which can communicate its results to the condition monitoring system.

In certain embodiments, the condition monitoring system can include a graphical user interface (GUI) that can present visualizations that represent the machines (e.g., turbomachines such as turbines, steam turbines, compressors, or pumps) being monitored by the condition monitoring system. In addition to the visualizations, the condition monitoring system can present the data received by the sensors associated with the monitored machines via the GUI. The condition monitoring system can also perform certain types of data processing or analysis functions such as plotting trend graphs, plotting statistical spectrum graphs, plotting historical charts, and the like, which can then be displayed via the GUI. In one embodiment, the raw data or the processed data associated with each independent sensor can be displayed via the GUI in a respective independent data analysis workspace on the GUI. However, in other embodiments, the GUI can receive an input requesting that the raw data or the processed data associated with each independent sensor be grouped together on a respective data analysis workspace based on properties shared by each sensor. That is, the GUI can group the raw data or the processed data associated with sensors that can be part of a particular hierarchical level of the industrial environment, the sensors that can be monitoring a similar type of component, or the like. Additional details with regard to how the GUI can dynamically group various types of data received or processed by the condition monitoring system will be described below with reference to FIGS. 1-10.

By way of introduction, FIG. 1 illustrates a block diagram of an industrial monitoring system 10 in which various types of machines used for industrial processes can be monitored. The industrial monitoring system 10 can include a condition monitoring system 12, which can receive data from various components (e.g., machines) that can be part of an industrial environment. For example, the condition monitoring system can monitor components used in a plant 14. The plant 14 can include any type of industrial environment where different components or machines can be used to complete one or more industrial processes. As such, the plant 14 can correspond to an oil refinery, a manufacturing facility, a turbomachine system, a power generation system, a gasification system, a chemical production system, a gas turbine system, a steam turbine system, a combined cycle system, a power plant, or the like.

The components in the plant 14 can include one or more machines 16, such as a gasifier, a gas treatment unit, an electric motor, a combustion engine, a gas turbine, a heat exchanger, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, boilers, furnaces, heat recovery steam generators (HRSGs), and the like. Each machine 16 can include one or more sensors 18 that can monitor various aspects of a respective machine 16. The sensors 18 can include temperature sensors, current sensors, voltage sensors, pressure sensors, displacement sensors, vibration sensors, velocity sensors, acceleration sensors, flow sensors, clearance sensors, flame sensors, gas composition sensors, vibration sensors, clearance sensors, gas composition sensors, speed sensors, emissions sensors, and any other type of sensor that can provide information with respect to the operation of the respective machine 16.

Generally, the data acquired by the sensors 18 can be received by the condition monitoring system 12 via a direct link (i.e., hardwired), a network link, or a portable memory device (e.g., Universal Serial Bus memory drive). In one embodiment, the condition monitoring system 12 can include a dynamic graphical user interface (GUI) 20 that can generate visualizations that represent the machines 16 and the sensors 18 being monitored by the condition monitoring system 12. As such, users of the condition monitoring system 12 can monitor the health or status of machines 16 in the plant 14 via the dynamic GUI 20. Further, the condition monitoring system 12 can be used to measure one or more mechanical devices of larger mechanical systems (e.g., steam turbine systems, hydraulic turbine systems, wind turbine systems, reactors, gasifiers, gas treatment systems, industrial automation systems, or other suitable mechanical systems).

The dynamic GUI 20 can enable the user to perform various types of data processing or analysis using tools provided by the condition monitoring system 12 or by separate data processing or analysis products. For instance, the user can generate a graph plotting a statistical trend of the data received from a particular sensor 18 over time. In one embodiment, after the statistical trend graph has been generated, the user can dynamically control the data being analyzed by the tool by selecting a different sensor 18 visualization displayed in the dynamic GUI 20.

In addition to data acquired by the sensors 18, the condition monitoring system 12 can receive data from a database 22 which can be stored within the condition monitoring system 12, in a server, in a cloud-computing device, or the like. The database 22 can include historical data related to the data acquired by the sensors 18, calculated data associated with a machine 16 or sensor 18, results from previous data processing or analysis functions performed on data associated with a machine 16 or sensor 18, or other contextual data related to the plant 14. For example, the database 22 can include data related to the historical operating conditions (e.g., when operating at full capacity) of the plant 14 such as a plant historian or the like.

Although FIG. 1 has been described with respect to an industrial environment, it should be noted that the systems and techniques described herein can be applied to other systems outside of the industrial environment. As such, the systems and techniques described herein should not be limited to industrial environments and the like.

Figure 2:
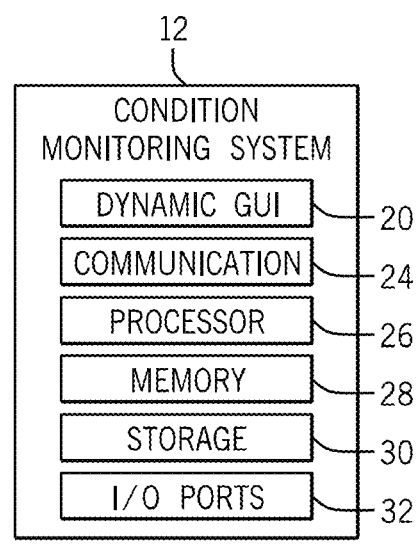
FIG. 2 illustrates a block diagram of a condition monitoring system that can be employed in the industrial monitoring system of FIG. 1, in accordance with embodiments presented herein.

In addition to the dynamic GUI 20, the condition monitoring system 12 can include various other components to display data, processing or analysis of data, and the like via the dynamic GUI 20. FIG. 2 illustrates a block diagram of some example components that can be part of the condition monitoring system 12. As shown in the figure, the condition monitoring system 12 can include a dynamic GUI 20, a communication circuit 24, a processor 26, a memory 28, a storage 30, input/output (I/O) ports 32, and the like. The communication circuit 24 can be a wireless or wired communication circuit that can facilitate communication between the condition monitoring system 12, the machines 16, the sensors 18, the database 22, other control or monitoring systems, and the like. The processor 26 can be any type of computer processor or microprocessor capable of executing computer-executable code. The memory 28 and the storage 30 can be any suitable articles of manufacture that can serve as media to store processor-executable code, data, or the like. These articles of manufacture can represent non-transitory computer-readable media (i.e., any suitable form of memory or storage) that can store the processor-executable code used by the processor 26 to, among other things, analyze data and dynamically link analyzed data with visualizations displayed and selected via the dynamic GUI 20. The non-transitory computer-readable media merely indicates that the media is tangible and not a signal.

The dynamic GUI 20 can include any type of display device including a touch screen display device that can receive user inputs via the display device itself. In certain embodiments, the dynamic GUI 20 can interact with the communication circuit 24, the processor 26, the memory 28, the storage 30, and the input/output (110) ports 32 to dynamically update or control visualizations displayed on the dynamic GUI 20. The dynamic GUI 20 can be disposed on any type of computing device including an industrial monitor, a workstation, a portable monitoring device, a smart phone device, or another suitable device.

Figure 3:
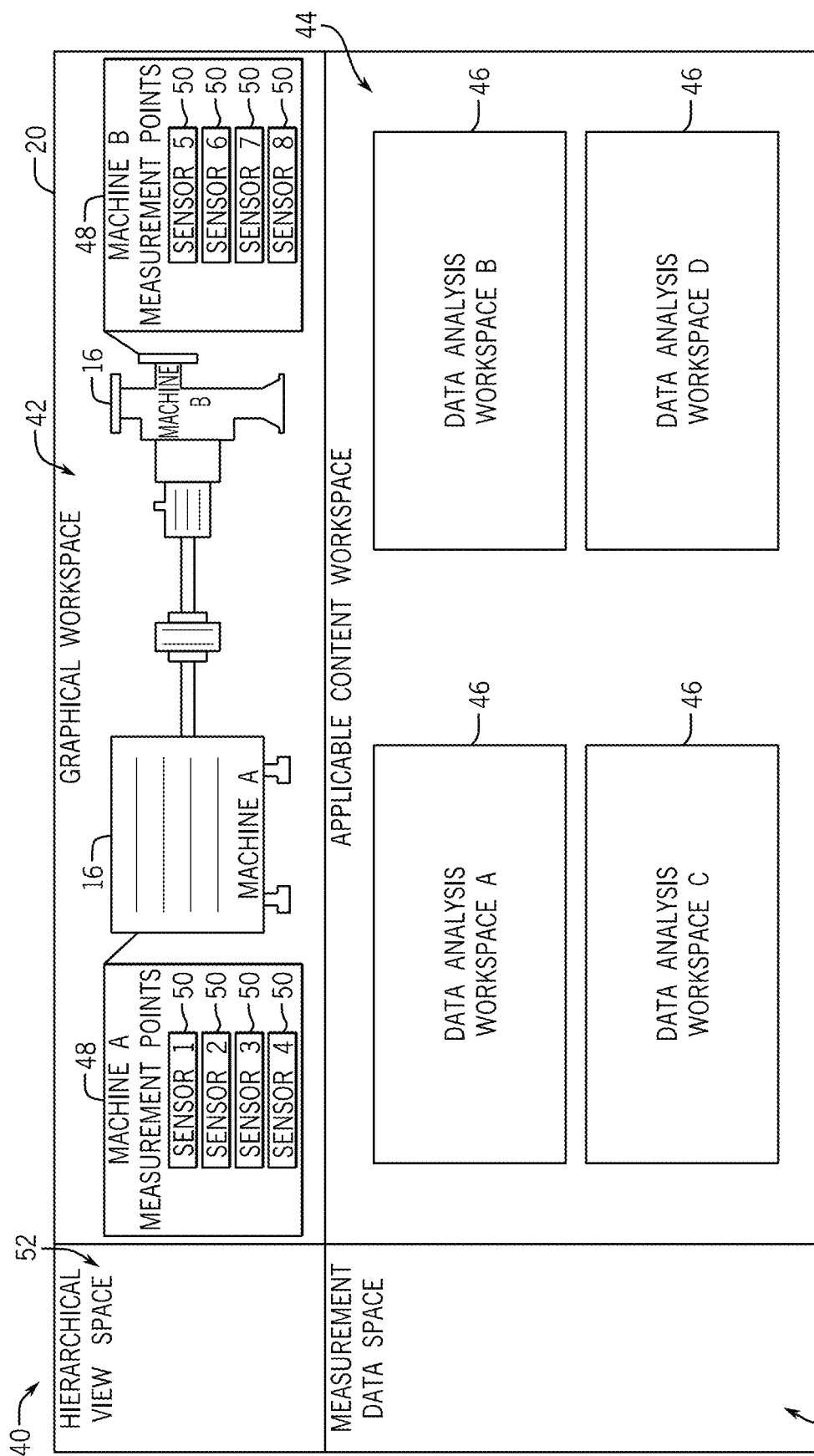
FIG. 3 illustrates a schematic view of graphics displayed on a graphical user interface for the condition monitoring system of FIG. 2, in accordance with embodiments presented herein.

Keeping the foregoing in mind, FIG. 3 illustrates an example view 40 of graphics that can be displayed by the processor 26 via the dynamic GUI 20. Referring to FIG. 3, the dynamic GUI 20 can include a graphical workspace 42 and an applicable content workspace 44. The graphical workspace 42 can include visualizations that represent the machines 16 or a subset of the machines 16 being monitored by the condition monitoring system 12. The machines 16 can be depicted in the graphical workspace 42 as a machine train diagram. The machine train diagram can illustrate how a number of machines 16 can be coupled to each other. The visualizations representing the machines 16 can be selectable objects that can be interacted with by a user of the condition monitoring system 12 via the dynamic GUI 20. In one embodiment, a user of the dynamic GUI 20 can select a visualization depicted in the graphical workspace 42, and the dynamic GUI 20 can then dynamically update various processing or analysis tools currently being displayed in the applicable content workspace 44 based on data that corresponds to the machine 16 associated with the selected visualization.

The applicable content workspace 44 can include a number of data analysis workspaces 46. Each data analysis workspace 46 can include results or outputs of various data processing or analysis tools provided by the condition monitoring system 12. The data processing or analysis tools can generate plots that illustrate various trends in the acquired data, spectrum information related to the acquired data, the historical values of the acquired data, the changes in the data over time, and the like. Some additional data processing or analysis outputs can include a waveform plot, a spectrum plot, an orbit plot, a bode plot, compressor performance curves, pump performance curves, histograms, bar graphs, shaft centerline plots, circular plots, waterfall plots, and the like. As such, after selecting a visualization in the graphical workspace 42, the user of the dynamic GUI 20 can send a request to the condition monitoring system 12 to perform some type of data processing or analysis function on the data associated with the machine 16 or sensor 18 that corresponds to the selected visualization. The dynamic GUI 20 can then display the results or outputs of the data processing or analysis in the data analysis workspace 46.

In addition to providing results of data processing or analysis, the applicable content workspace can also provide additional information related to alarm events, statuses, reference materials, and the like regarding a machine 16 or sensor 18 associated with a selected visualization in the graphical workspace 42. The additional information can include various reports, original equipment manufacturer datasheets, work history, and the like.

Referring back to the graphical workspace 42, the graphical workspace 42 can also include a data field 48 that can display data entries 50 associated with a respective machine 16. The data entries 50 can include real-time measurement data received from various sensors 18 disposed on a respective machine 16, data calculated by the processor 26, or the like. The data entries 50 can also include an alarm status or event status indication. For example, each data entry 50 can be shaded with a particular color or associated with a particular color to indicate to the user a specific alarm status. In one embodiment, each data entry 50 can be individually selectable like the visualizations of the machines 16, such that additional information regarding the selected data entry 50 can be presented in the applicable content workspace upon selection.

When a particular data entry 50 has been selected in the graphical workspace 42, the dynamic GUI 20 can dynamically update a hierarchical view space 52 to indicate that the respective data entry 50 has been selected. The hierarchical view space 52 can display a hierarchical structure of the machine train diagram depicted in the graphical workspace 42. That is, the hierarchical structure can list the components depicted in the graphical workspace 42 based on its hierarchical relationship to other components in the graphical workspace 42. For example, Machine A and Machine B can be listed underneath an enterprise that represents the entire machine train diagram depicted in the graphical workspace 42. Under each machine, the data entries 50 for each respective machine can be listed as one hierarchical step removed from the respective machine.

Keeping this in mind, when a particular data entry 50 has been selected in the graphical workspace 42, the dynamic GUI 20 can dynamically highlight the corresponding component listed in the hierarchical view space 52. In this manner, the dynamic GUI 20 can dynamically update different parts of the dynamic GUI 20 after a user makes a single selection elsewhere in the dynamic GUI 20. In the same fashion, when a particular data entry 50 has been selected in the hierarchical view space 52, the dynamic GUI 20 can dynamically highlight or select the corresponding component listed in the graphical workspace 42.

The dynamic GUI 20 can also include a measurement data space 54. The measurement data space 54 can include all measurement types that can have been collected for a component selected in the hierarchical view space 52 or the graphical workspace 42. As such, the measurement data space 54 can include a number of visualizations or headers for different categories or types of collected measurements. The measurements can include diagnostic waveforms/spectrums, vectors, scalar variables, and the like. Each type of collected measurement can also be a selectable object dynamically linked with a component displayed in the hierarchical view space 52, the graphical workspace 42, and the applicable content workspace.

In certain embodiments, the components in the graphical workspace 42, the applicable content workspace, the hierarchical view space 52, and the measurement data space 54 can be linked together using software pointers. That is, each selectable object can include one or more pointers that can direct the dynamic GUI 20 to data associated with the selected component, such that the graphical workspace 42, the applicable content workspace, the hierarchical view space 52, and the measurement data space 54 can be updated based on the data associated with the selected component. For example, when a component is selected within the graphical workspace 42, the data presented in the applicable content workspace, the hierarchical view space 52, and the measurement data space 54 can be updated to match the data associated with the selected component. In this manner, each portion of the dynamic GUI 20 can be dynamically updated based on a selection of a component via the dynamic GUI 20.

As mentioned above, the measurement data space 54 can include all measurements that can have been collected for a component selected in the hierarchical view space 52 or the graphical workspace 42. Generally, when the user selects an entry in the measurement data space 54, an individual data analysis workspace 46 can be generated for each individual data source that can be associated with the selected entry. That is, if the user selects an entry in the measurement data space 54 that is associated with a number of measurement points, the GUI 20 can generate an individual data analysis workspace 46 for each individual measurement point. By generating an individual data analysis workspace 46 for each individual measurement point, the GUI 20 groups the data presented in the data analysis workspaces 46 according to measurement points.

Figure 4A:
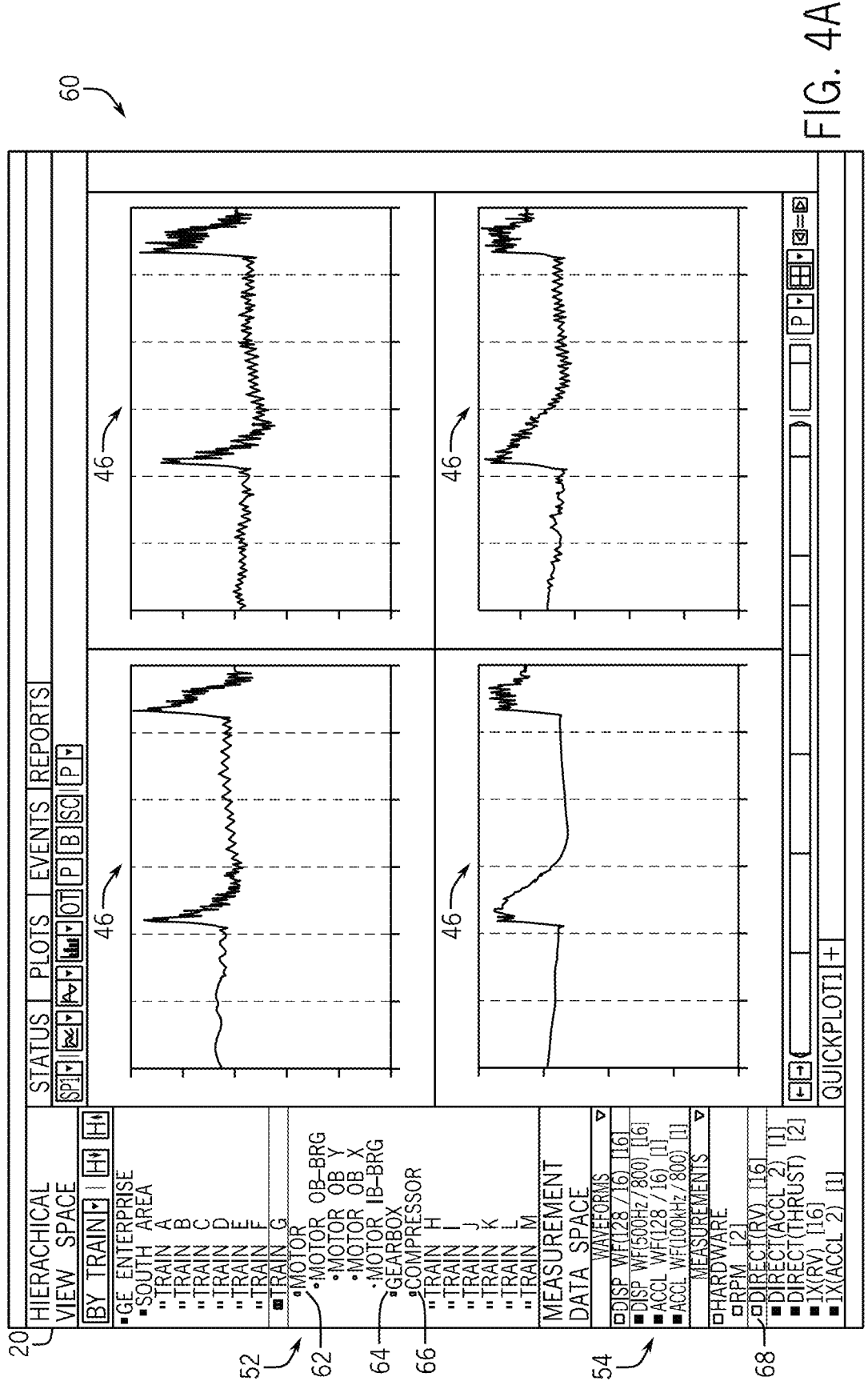
Figure 4B:
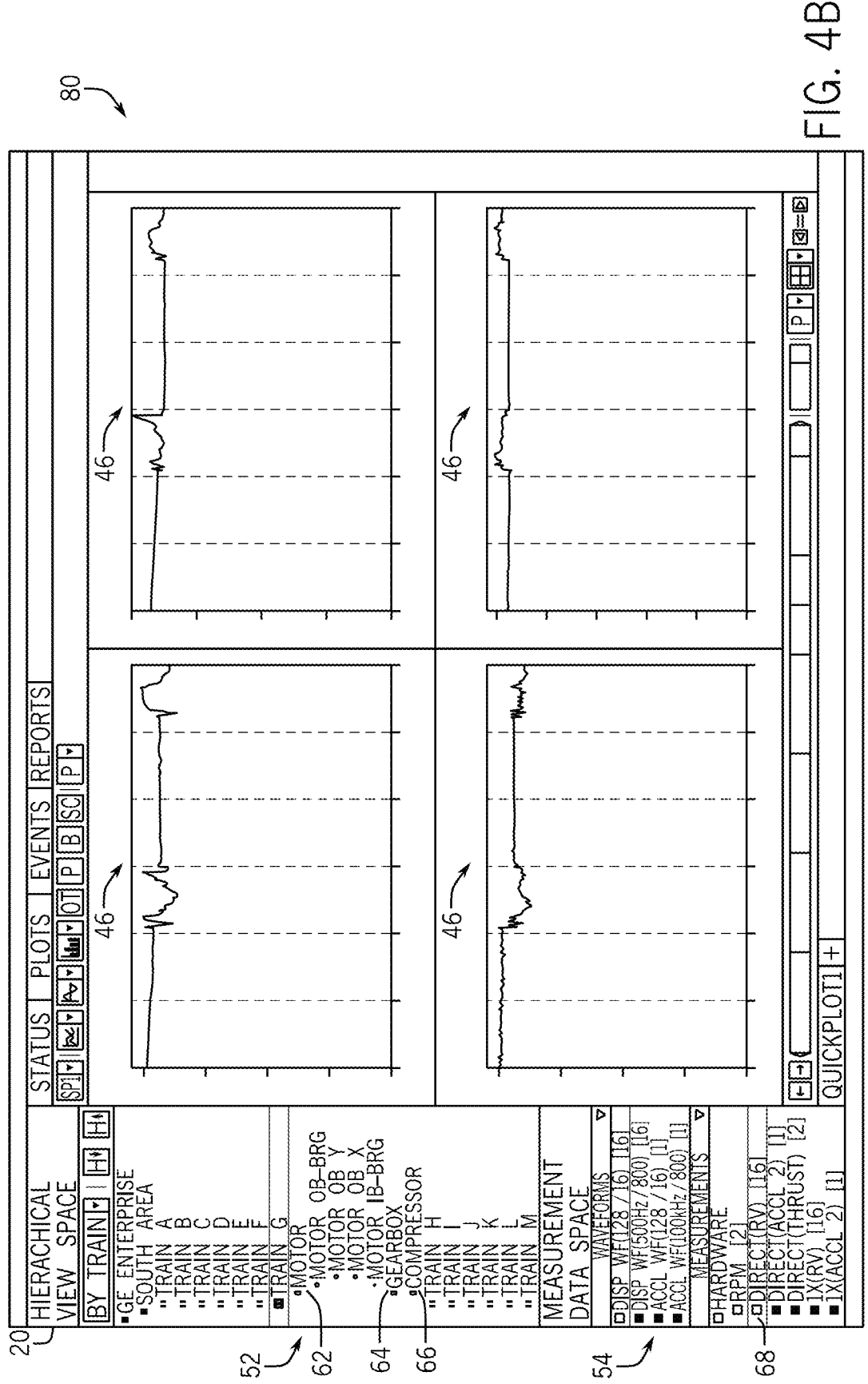
Figure 4D:
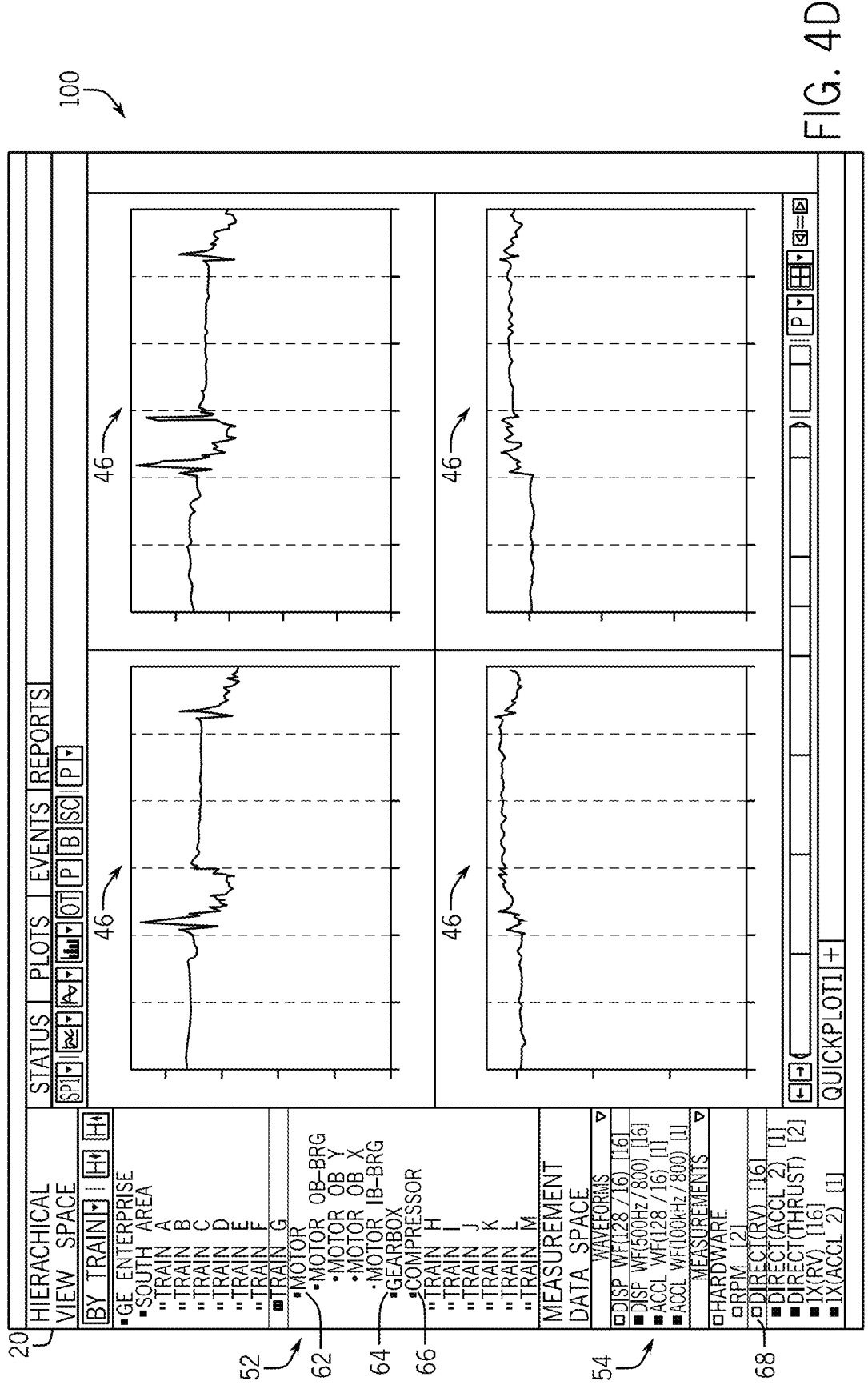

Keeping the foregoing in mind, FIGS. 4A-4D illustrate schematic views 60, 80, 90, 100 of a number of plots generated in corresponding data analysis workspaces 46 via the GUI 20 when an entry in the measurement data space 54 has been selected. Referring first to FIG. 4A, machine train diagram G ("Train G") in the hierarchical view space 52 is indicated as being selected. Here, the machine train diagram G includes a motor 62, a gearbox 64, and a compressor 66. For the purposes of discussion, the motor 62 can include, for example, two bearings: an outboard bearing (OB) and an inboard bearing (IB). Each bearing of the motor 62 can include two data measurement points (i.e., X measurement and Y measurement). As such, the motor 62 can be associated four bearing data measurement points.

In the same manner, the gearbox 64 may, in one example, include four bearings: a low speed inboard bearing, a low speed outboard bearing, a high speed inboard bearing, and a high speed outboard bearing. Each bearing of the gearbox 64 can also include two data measurement points (i.e., X measurement and Y measurement). As such, the gearbox 64 can be associated eight bearing data measurement points.

Similarly, the compressor 66 may, for instance, include two bearings: an inboard bearing and an outboard bearing. Each bearing of the compressor 66 can also include two data measurement points (i.e., X measurement and Y measurement). As such, the compressor 66 can be associated four bearing data measurement points.

In one embodiment, the GUI 20 can receive a selection or input in the measurement data space 54 at a measurement entry associated with a direct RV (radial vibration) data entry 68. The direct RV measurement type 68 can be associated with the sixteen measurement points from the bearings of the motor 62, the gearbox 64, and the compressor 66. As such, in one embodiment, the GUI 20 can generate an individual plot for each of the sixteen measurement points in a respective data analysis workspace 46, as shown in FIGS. 4A-4D.

Referring to FIGS. 4A-4D, the sixteen measurement points associated with the direct RV measurement type 68 can be grouped in each respective data analysis workspace 46 by point. That is, the GUI 20 can generate a plot or some data analysis visualization for each measurement point associated with the direct RV measurement type 68. As such, the GUI 20 can group the data corresponding to the sixteen measurement points received from the bearings of the motor 62, the gearbox 64, and the compressor 66 by its respective measurement point.

Figure 5:
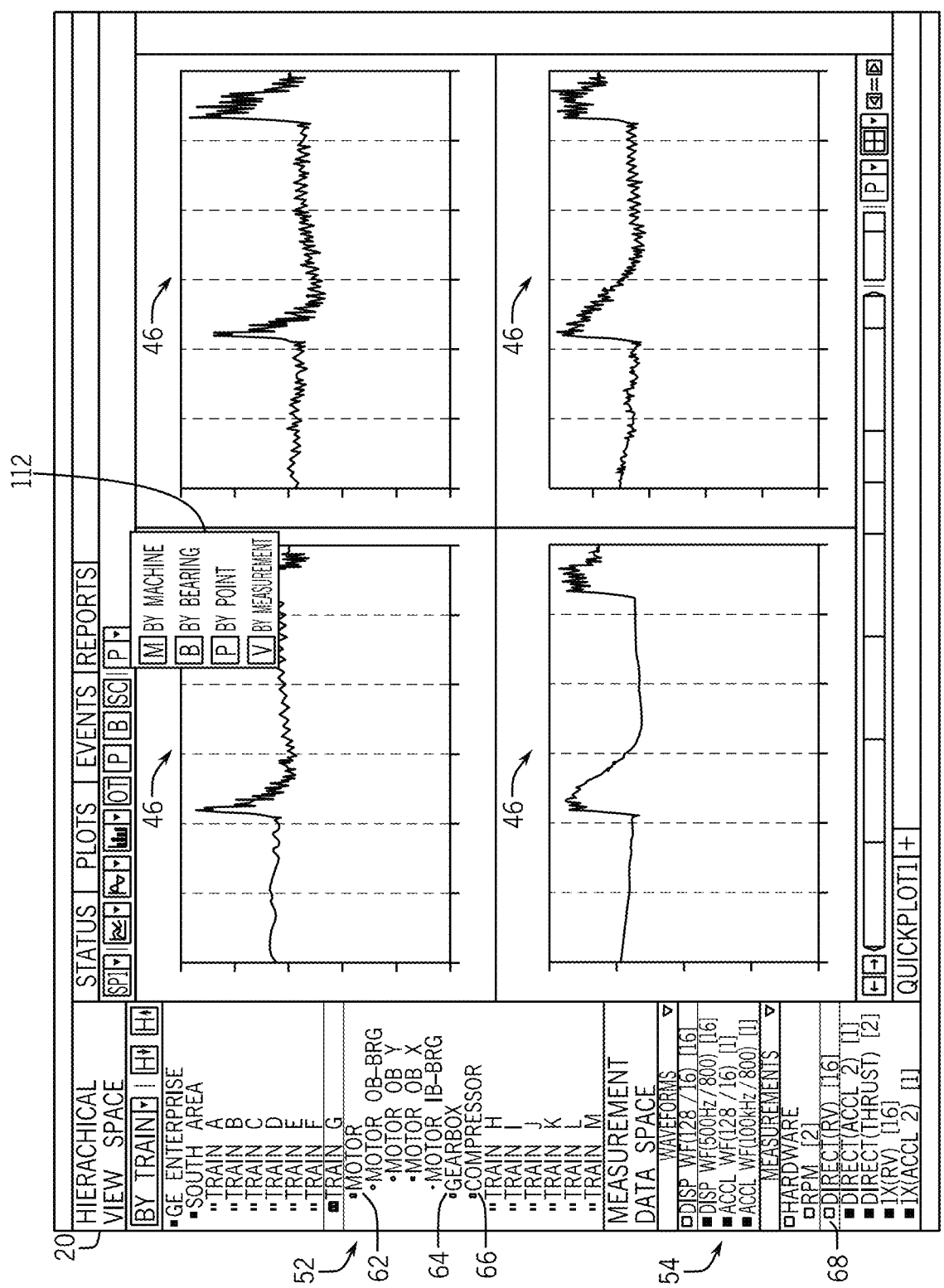
FIG. 5 illustrates a schematic view of a visualization providing an option to group the number of plots of FIGS. 4A-4D, in accordance with embodiments presented herein.

In one embodiment, the GUI 20 can provide a number of options (e.g., grouping modes) in which the data associated with a selected input (e.g., the direct RV measurement type 68) can be grouped. For example, FIG. 5 illustrates a schematic view 110 of a visualization 112 for providing a number of options for grouping the data associated with the selected input. As shown in FIG. 5, the visualization 112 can provide that the GUI 20 group the data associated with the selected input by point, by machine, by bearing, by measurement type, and the like.

As illustrated in FIGS. 4A-4D, when grouping the data by point, the GUI 20 can group the data associated with each measurement point to a single data analysis workspace 46. As such, when the selected input (e.g., the direct RV measurement type 68) is associated with the sixteen measurement points, the GUI 20 can group the data associated with each respective measurement point on a single data analysis workspace 46.

When grouping the data by machine, the GUI 20 can group all of the measurement points associated with a particular machine onto a single data analysis workspace 46. That is, the GUI 20 can analyze all of the data associated with selected measurement points for each machine 16, and display the analyzed data for each machine 16 in a single data workspace 46. For example, the GUI 20 can display the analyzed data for each machine 16 in a stacked or overlaid plot type, such that data associated with a measurement point from the respective machine 16 can be depicted in the same data analysis workspace 46. In other words, when the GUI 20 displays the analyzed data for each machine 16, the GUI 20 can display the measurement points associated with the selected input for the corresponding machine 16 that can include the measure points that correspond to, for example, a motor, compressor, pump, generator, gas turbine engine, steam turbine, hydro turbine, wind turbine, gasifier, gas treatment system, heat recovery steam generator, or the like.

Figure 6A:
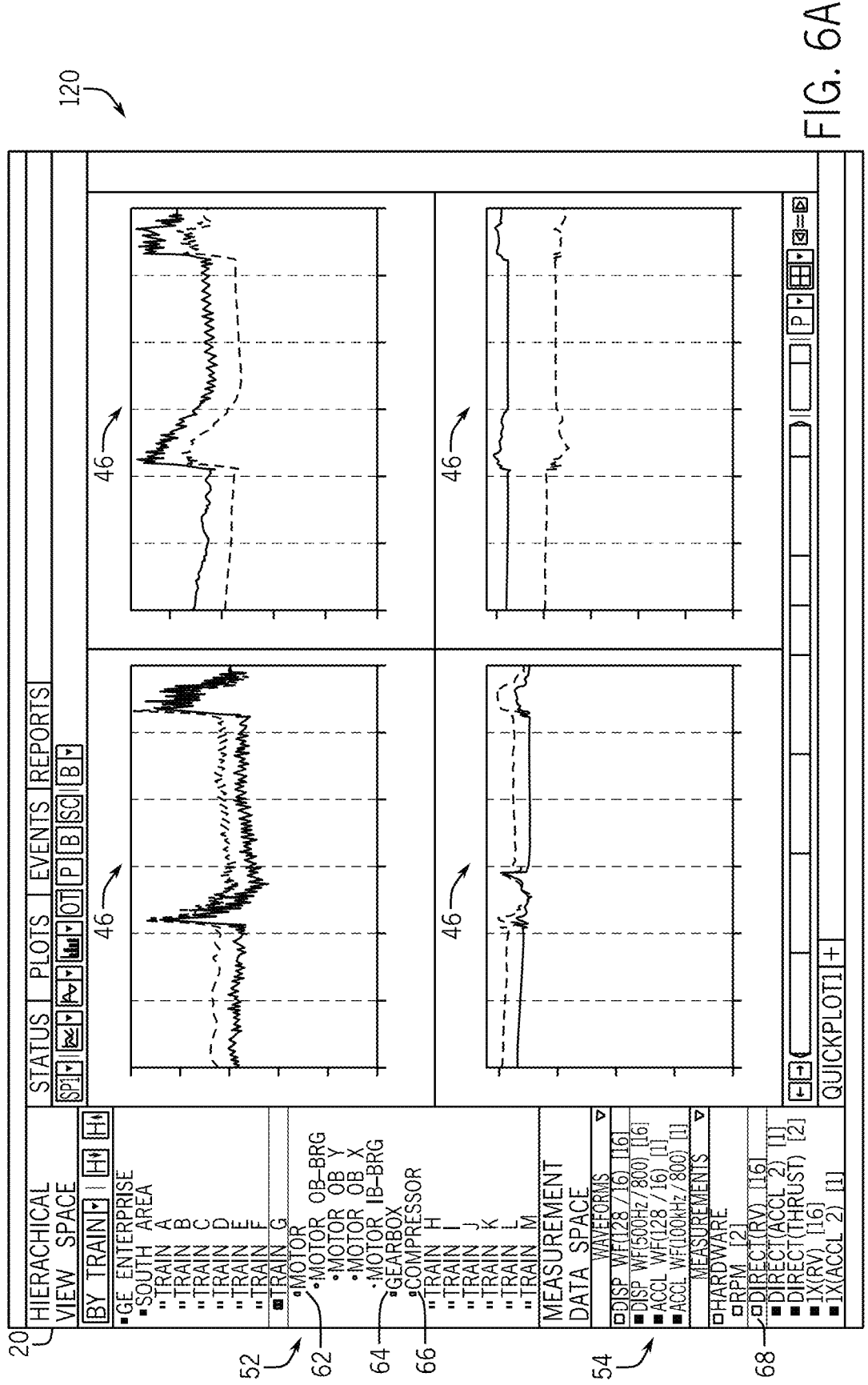
FIGS. 6A-6B illustrate schematic views of example groupings of the number of plots of FIGS. 4A-4D, in accordance with embodiments presented herein.
Figure 6B:
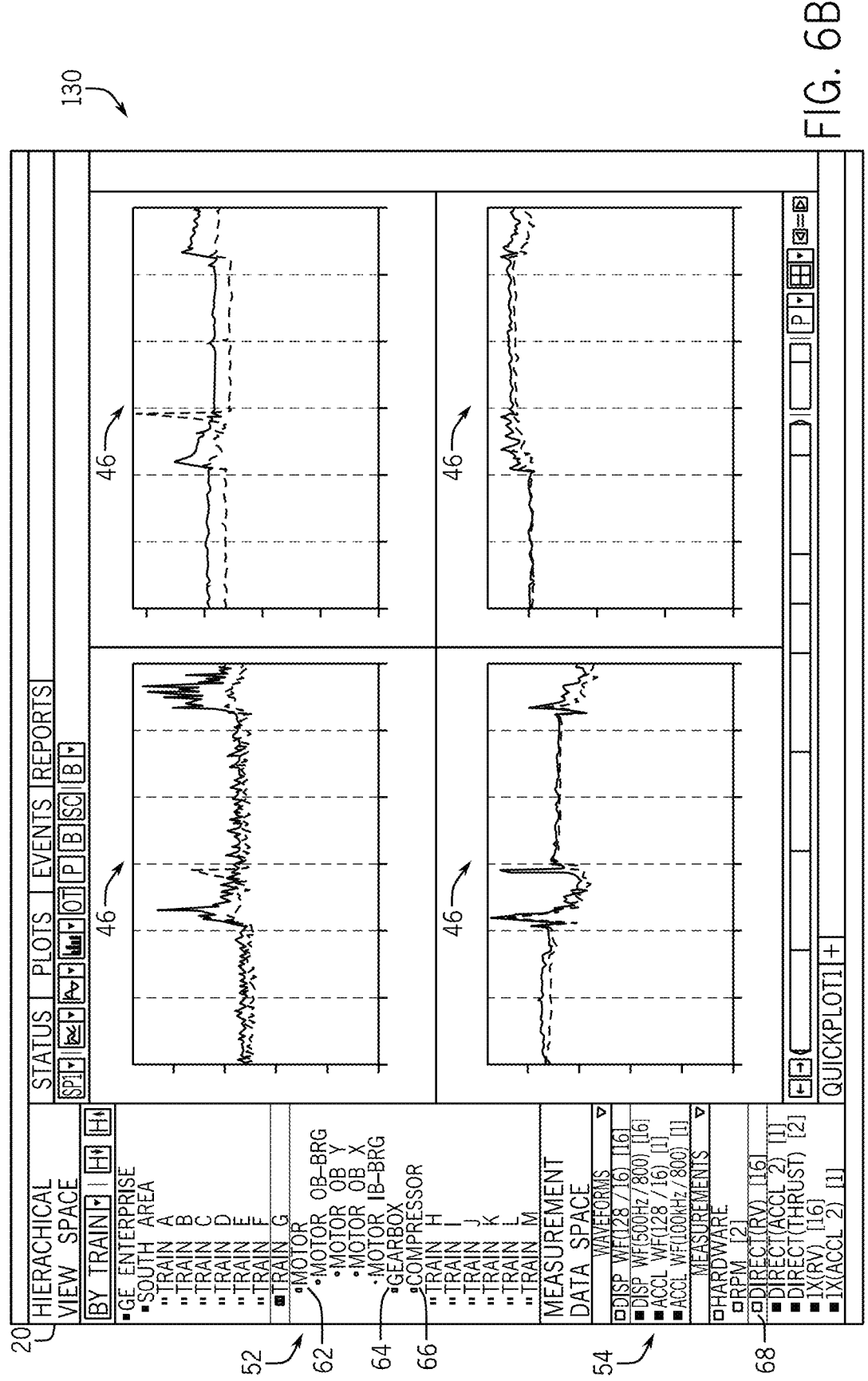

When grouping the data by bearing, the GUI 20 can group all of the measurement points associated with a particular bearing on a single data analysis workspace 46. For example, FIGS. 6A and 6B illustrate schematic views 120 and 130 of the sixteen measurement points associated with the direct RV measurement type 68 grouped according to a respective bearing. That is, the sixteen measurement points associated with the direct RV measurement type 68 can include two measurement points for each of eight bearings that can be in the motor 62, the gearbox 64, and the compressor 66. As such, the GUI 20 can include the data analysis (e.g., plots) associated with the measurement points for each respective bearing on a single data analysis workspace 46. As a result, each of the eight data analysis workspaces 46 depicted in FIGS. 6A and 6B include two plot curves—one for each measurement point associated with a respective bearing. In addition to grouping the data by bearings, in certain embodiments, the GUI 20 can group measurement points according to a subcomponent of the machine 16. For example, a compressor machine can include subcomponents such as a combustor, a fuel nozzle, a turbine, and the like. As such, the GUI 20 can provide options to the user to group the data associated with the compressor by its association with the combustor, the fuel nozzle, the turbine, and the like.

Referring back to FIG. 5, the visualization 112 can also provide an option to group all of the measurement points associated with a selected input by measurement type. That is, all of the measurement points associated with a particular measurement selection can be added to a single data analysis workspace 46. For example, the GUI 20 can display the analyzed data for each measurement type selected in the measurement data space 54 in a stacked or overlaid plot type, such that data associated with each measurement type can be depicted in the same data analysis workspace 46.

Figure 7:
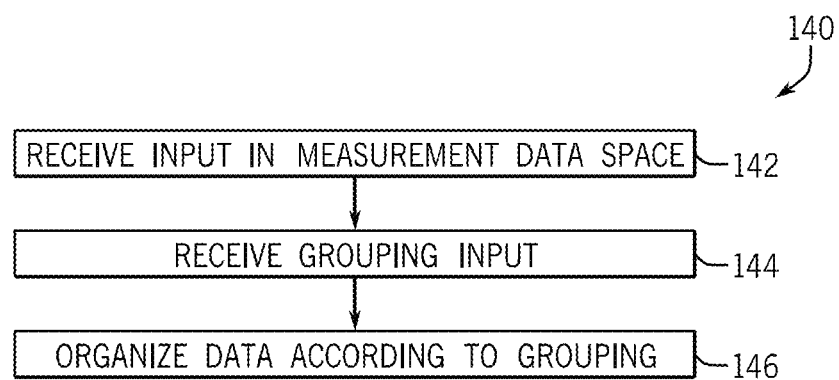
FIG. 7 illustrates a flow chart of a method for organizing data according to a grouping associated with the industrial monitoring system of FIG. 1, in accordance with embodiments presented herein.
Figure 8A:
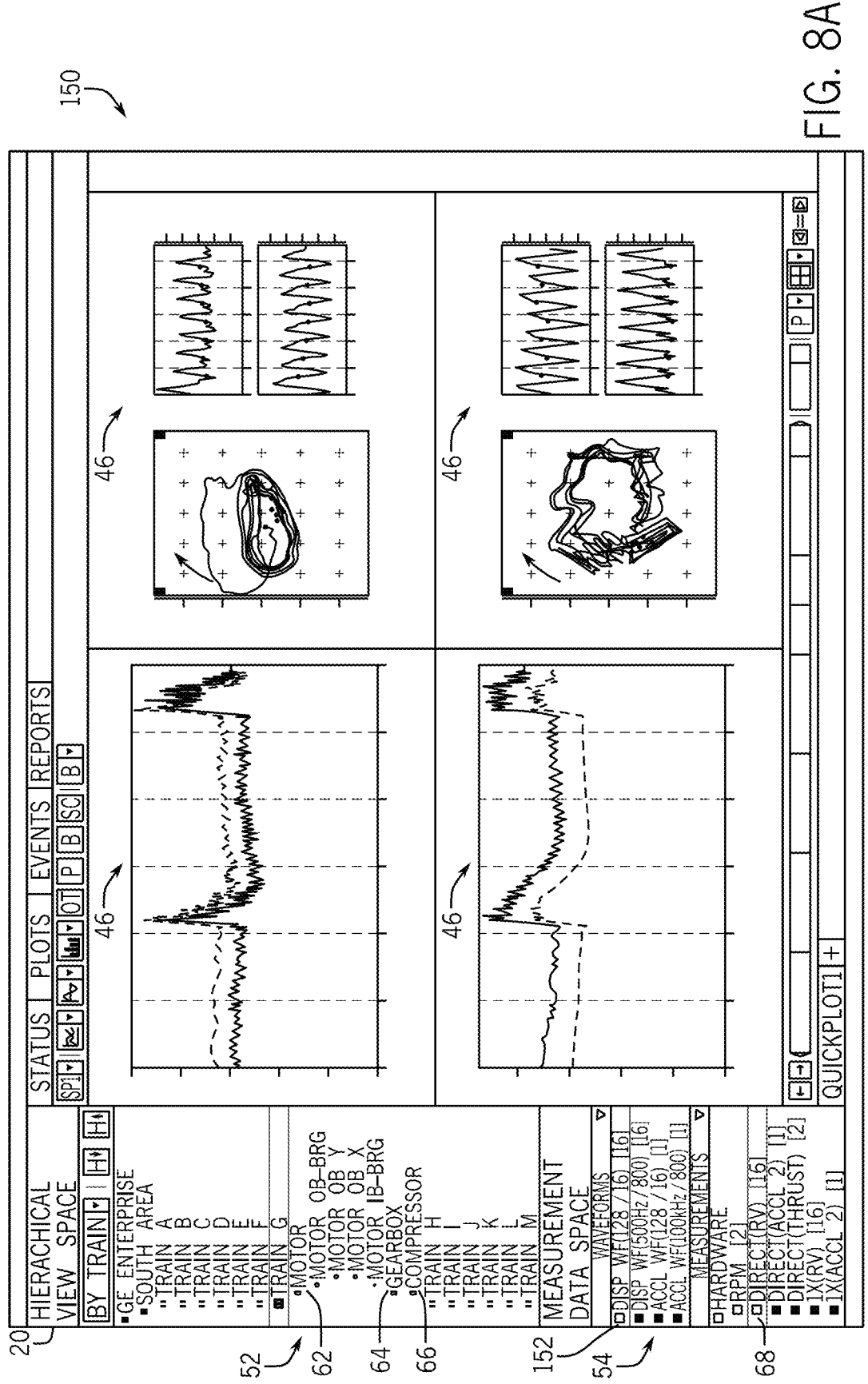
Figure 8B:
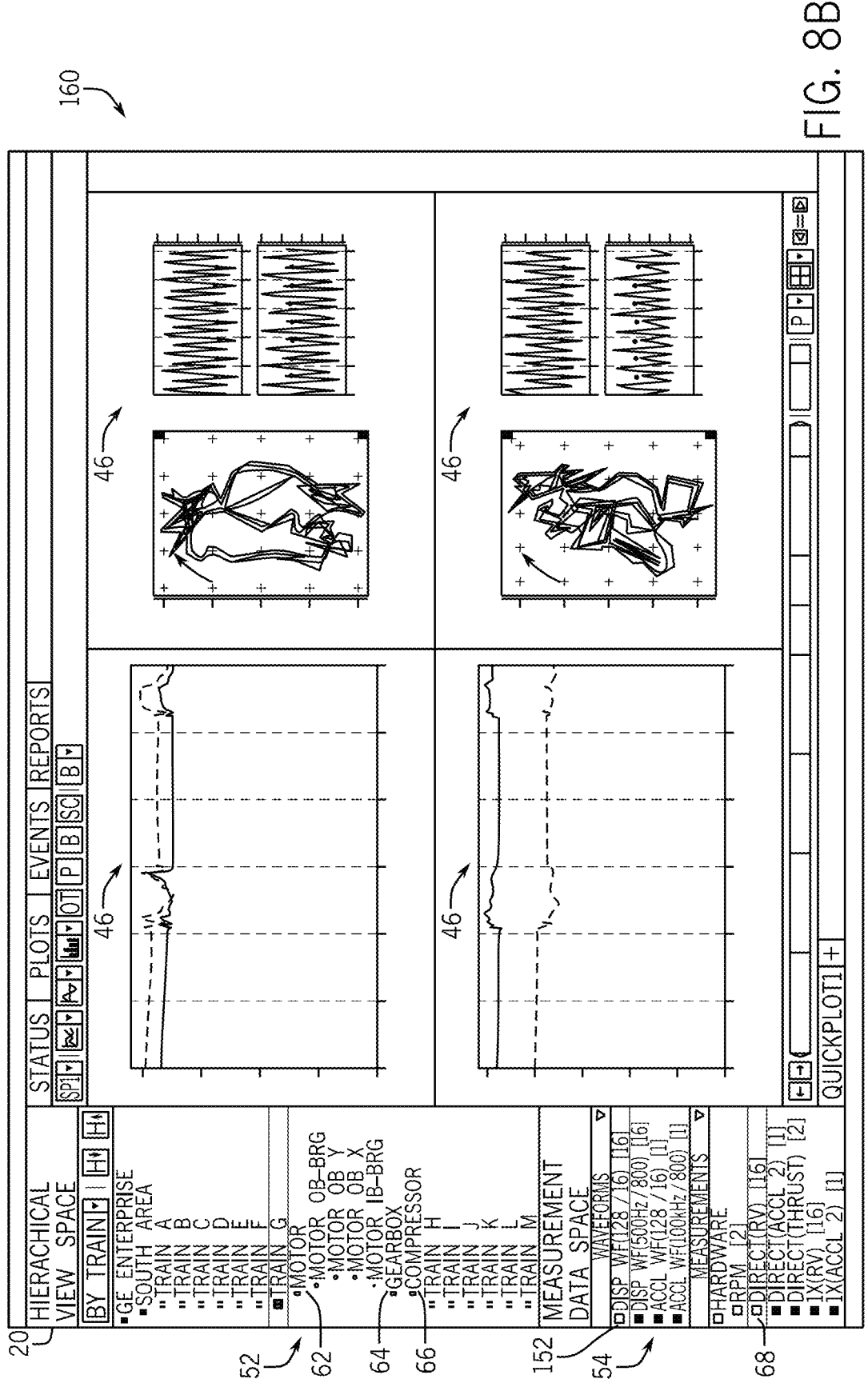
Figure 8C:
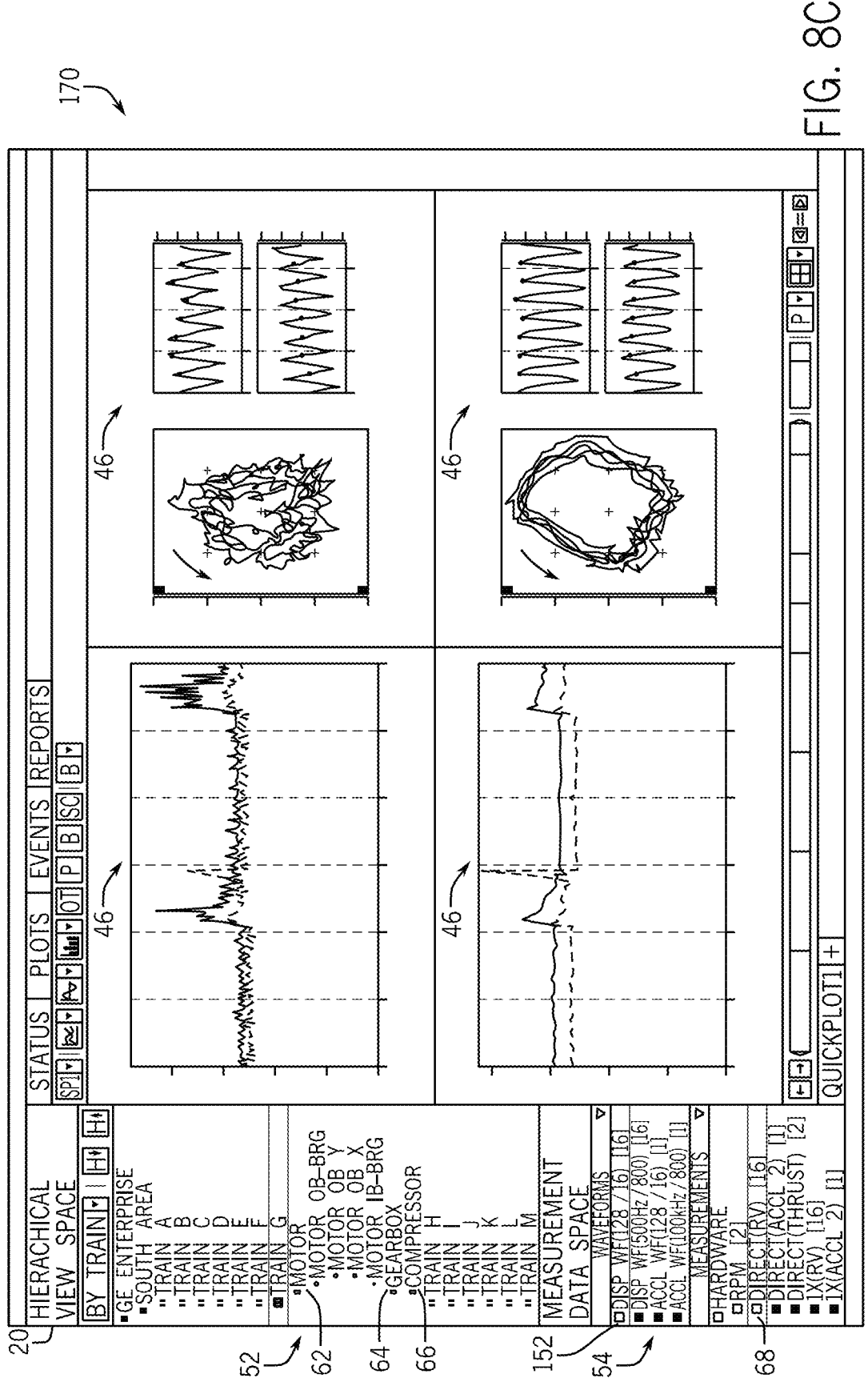

Keeping the foregoing in mind, FIG. 7 illustrates a flowchart of a method 140 for organizing data according to a grouping selected by a user of the GUI 20. In certain embodiments the method 140 can be performed by the GUI 20, the processor 26, or the like.

As shown in FIG. 7, at block 142, the GUI 20 can receive an input in the measurement data space 54. As mentioned above, the measurement data space 54 can include all measurement data that can have been collected for a component selected in the hierarchical view space 52. As such, if the component selected in the hierarchical view space 52 includes subcomponents, all of the measurement data collected for each subcomponent of the selected component can be grouped together as a particular measurement field in the measurement data space 54.

For instance, referring briefly to FIG. 5, the machine train diagram G can be selected in the hierarchical view space 52 and the direct RV measurement type 68 can be selected, as the input received at block 142, in the measurement data space 54. As such, the direct RV measurement type 68 can include all of the measurement data associated with the direct RV data for the machine train diagram G, which can include the motor 62, the gearbox 64, the compressor 66, and the respective components and subcomponents that correspond to the motor 62, the gearbox 64, and the compressor 66.

After receiving the input at block 142, at block 144, the GUI 20 can receive an input indicating a type of grouping to group the measurement data associated with the selected input. In one embodiment, the GUI 20 can receive an input via the visualization 112 providing that the GUI 20 groups the measurement data associated with the selected input by machine, bearing, point, or measurement type.

At block 146, the GUI 20 can organize the measurement data that corresponds to the selected input at block 142 according to the grouping input received at block 144. As such, the GUI 20 can group the measurement data that corresponds to the selected input at block 142, such that each data analysis workspace 46 can include the respective measurement data for each respective machine, respective bearing, respective point, or respective measurement type, which can have been specified at block 144.

Figure 11A:
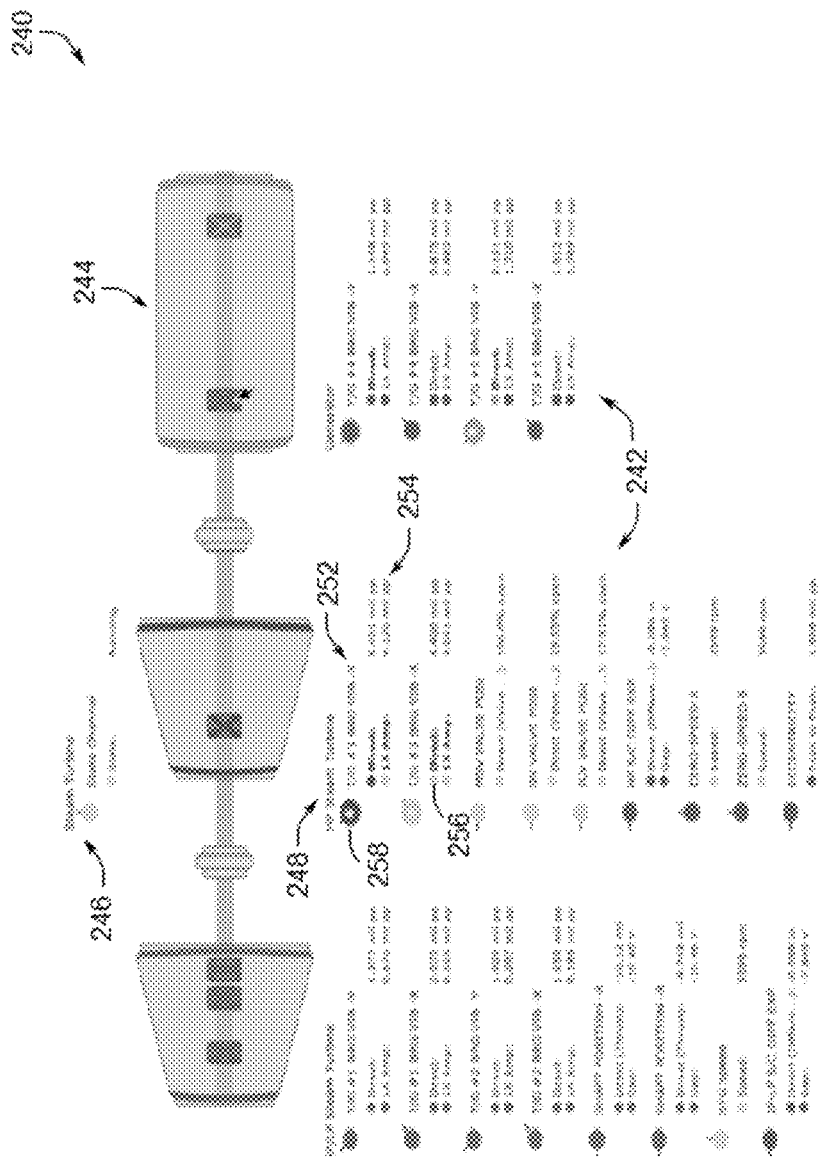
FIGS. 11A-11B illustrate schematic views of example measurements automatically grouped into columns generated via the graphical user interface for the condition monitoring system of FIG. 2, in accordance with embodiments presented herein.
Figure 11B:
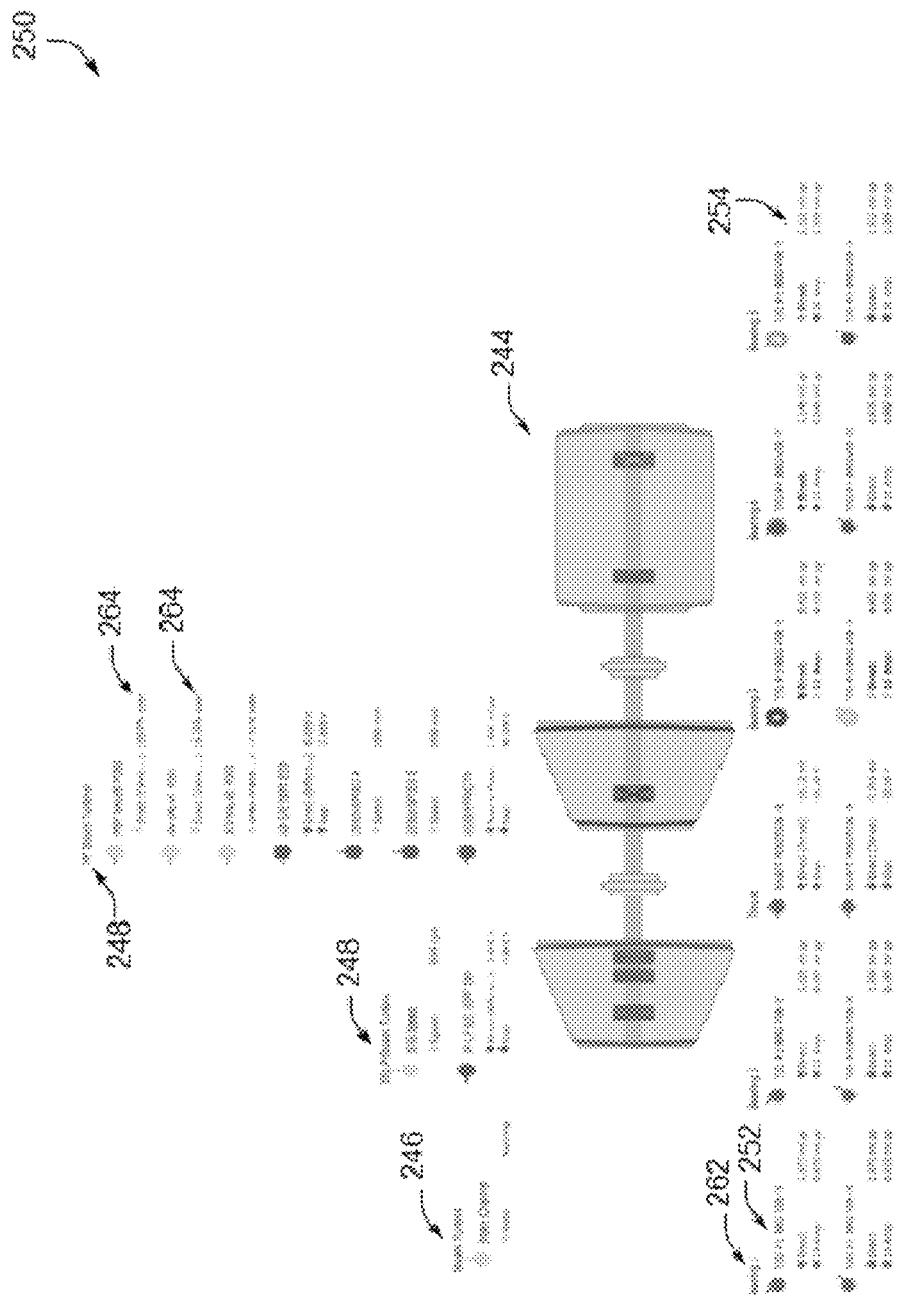

In addition to grouping measurement data by generating a stacked or overlaid plot, as generally shown in FIGS. 6A-6B, the measurement data can be grouped into one or more columns along with the sensors from which the measurement data derives. For example, FIGS. 11A and 11B illustrate schematic views 240 and 250, which graphically depict a machine diagram including measurement data and the sensors 18 from which the measurement data derives automatically grouped together into one or more columns in response to a selection of the grouping mode (e.g., by a particular machine, by a particular bearing, by a measurement point, by a measurement, etc.).

As generally explained above, the plurality of sensors 18 can be disposed on a plurality of machine trains (e.g., "Train A," "Train B," etc.) or one or more components within the plurality of machine trains. The plurality of sensors 18 can include, for instance, temperature sensors, current sensors, voltage sensors, pressure sensors, displacement sensors, vibration sensors, velocity sensors, acceleration sensors, torque sensors, flow sensors, clearance sensors, gas composition sensors, speed sensors, emissions sensors, or any combination thereof. The machine trains can include, for instance, a gasifier, a gas treatment unit, a machine, a motor, a gas turbine, a heat exchanger, a pump, a compressor, a fan, a generator, a steam turbine, a wind turbine, piping, or any combination thereof. Each machine train can include one or more of the machines 16 which are configured to operate in an industrial environment (e.g., industrial plant 14).

The communication circuit 24 can be operatively coupled to the plurality of sensors 18 and can communicate data measured by the plurality of sensors 18 throughout the condition monitoring system 12, as well as the components thereof, the machines 16, the sensors 18, the database 22, other control or monitoring systems, and the like. The dynamic GUI 20 can generate one or more visualizations of the data measured by the sensors 18, as described in detail herein. Furthermore, the processor 26 can receive the data measured by the sensors 18 via the communication circuit 24, and can generate a plurality of measurements based on the measured data. The processor 26 can also operatively control the GUI 20 so as to automatically group measurement data and the sensors 18 from which the measurement data derives into one or more columns or tables, thus providing configurable machine diagram views which can be easily understood and manipulated, as described in detail below.

Firstly, the GUI 20 can display a plurality of selectable objects corresponding to the plurality of machine trains (e.g., "Train A," "Train B," etc.). For instance, the hierarchical view space 52 may display a hierarchical structure of the machine train diagram depicted in the graphical workspace 42, as shown in FIG. 3. That is, the hierarchical structure may list the components depicted in the graphical workspace 42 based on its hierarchical relationship to other components in the graphical workspace 42. For example, Train A, consisting of Machine X and Machine Y, may be listed underneath an enterprise in hierarchical view space 52 with its corresponding machine train diagram depicted in the graphical workspace 42. Under each machine, the data entries 50 for each respective machine may be listed as one hierarchical step removed from the respective machine.

Then, a selection of one of the plurality of selectable objects can be received through the GUI 20 and analyzed by the processor 26. The selection can correspond to a particular machine train of the plurality of machine trains. For instance, machine train diagram H ("Train H"), or any other machine train, in the hierarchical view space 52 can be selected. Upon selection of a machine train, components thereof can be displayed in the hierarchical view space 52 under the selected machine train. As a non-limiting example, the machine train diagram H can include a steam turbine comprising an IP/LP steam turbine, an HP steam turbine, and a generator. Each of the IP/LP steam turbine, HP steam turbine, and generator can include multiple bearings (BRG). Many of the bearings can include two data measurement points (i.e., X measurement and Y measurement), as shown in FIGS. 11A and 11B.

Next, a selection of a grouping mode specifying a machine train metric by which to group the measured data for display can be received through the GUI 20 and analyzed by the processor 26. As explained above, the selected grouping mode can be one of a plurality of predefined grouping modes, such as grouping by a particular machine, grouping by a particular bearing, grouping by a measurement point, grouping by a measurement, or the like. For example, the GUI 20 can display a visualization 112 for providing a number of options for grouping the data associated with the selected input, as shown in FIG. 5. The visualization 112 may provide that the GUI 20 group the data associated with the selected input by machine, by bearing, by point, by measurement type, and the like.

In response to the selection of the grouping mode, the processor 26 can operatively control the GUI 20 so as to display a plurality of measurements corresponding to data measured by the sensors 18 that is associated with the selected machine train along with a plurality of sensors 18 from which the plurality of measurements derive. More specifically, the GUI 20 can automatically group the plurality of measurements and the plurality of sensors 18 into one or more columns or tables according to the selected grouping mode. Each of the measurements can derive from a particular sensor 18 among the plurality of sensors 18 disposed on the plurality of machine trains or one or more components (e.g., a machine, a bearing, etc.) within the plurality of machine trains.

To illustrate, FIG. 11A shows an example schematic view 240, which graphically depicts a machine diagram, in which the measurement data can be automatically grouped by machine component in response to a selection of the "group by machine" grouping mode. The GUI 20 can therefore display one or more columns 242 wherein each column corresponds to a particular machine 248 of the selected machine train (e.g., "Train H"). In this example, three columns 242 are displayed corresponding to machines "IP/LP Steam Turbine," "HP Steam Turbine," and "Generator," respectively. The names of the machines 248 can be displayed as labels at the top of each column 242, representing the top hierarchical level of the measurement data contained in each column 242.

Under the names of each machine 248 can be displayed a list of one or more sensors 252 among the plurality of sensors 18 disposed on a particular machine within the selected machine train. In this example, the column 242 corresponding to machine "IP/LP Steam Turbine" can include sensors "T/G #1 BRG VIB –Y," "T/G #1 BRG VIB –X," "T/G #2 BRG VIB –Y," "T/G #2 BRG VIB –X," "SHAFT POSITION –A," "SHAFT POSITION –B," "STG Speed," and "IP-LP S/C DIFF EXP," indicating that such sensors 252 are disposed on or within the corresponding machine 248.

Furthermore, under the names of each sensor 252 can be displayed a list of one or more measurements 254 among the plurality of measurements deriving from the one or more sensors 252. In this example, the column 242 corresponding to machine "IP/LP Steam Turbine" can include sensor "T/G #1 BRG VIB –Y," under which measurements "Direct" and "1×Amp" can be listed, indicating that such measurements 254 derive from the sensor "T/G #1 BRG VIB –Y." Thus, each of the measurements 254 can be grouped with the sensor 252 from which the respective measurement derives, within the appropriate column 242, as shown in FIG. 11A.

It can be noted that one measurement 254 or multiple measurements 254 can be derived from the data measured by the sensors 18. In some cases, the processor 26 can generate a single measurement 254 from data measured by any of the sensors 18. In other cases, the processor 26 can generate multiple measurements 254 from the data measured by any of the sensors 18.

The organization of measurement data as displayed by the GUI 20 can be dynamically re-arranged in real-time in response to user input. For instance, when a new grouping mode is selected, the one or more columns 242 can be automatically reorganized to reflect the desired grouping, thus allowing the user to easily and efficiently customize the machine view.

In this regard, FIG. 11B shows an example schematic view 250 in which the measurement data can be automatically grouped by bearing in response to a selection of the "group by bearing" grouping mode. The GUI 20 can therefore display one or more columns 242 wherein each column corresponds to a particular bearing 262 of the selected machine train (e.g., "Train H"). In this example, six columns 242 are displayed corresponding to bearings "Bearing 1," "Bearing 2," "Thrust," "Bearing 3," "Bearing 4," and "Bearing 5," respectively. The names of the bearings 262 can be displayed as labels at the top of each column 242, representing the top hierarchical level of the measurement data contained in each column 242.

Under the names of each bearing 262 can be displayed a list of one or more sensors 252 among the plurality of sensors 18 disposed on a particular bearing on or within the selected machine train. In this example, the column 242 corresponding to bearing "Bearing 1" can include sensors "T/G #1 BRG VIB –Y" and "T/G #1 BRG VIB –X," indicating that such sensors 252 are disposed on or within the corresponding bearing 262.

Furthermore, under the names of each sensor 252 can be displayed a list of one or more measurements 254 among the plurality of measurements deriving from the one or more sensors 252. In this example, the column 242 corresponding to bearing "Bearing 1" can include sensor "T/G #1 BRG VIB –Y," under which measurements "Direct" and "1×Amp" can be listed, indicating that such measurements 254 derive from the sensor "TIG #1 BRG VIB –Y." Thus, each of the measurements 254 can be grouped with the sensor 252 from which the respective measurement derives, within the appropriate column 242, as shown in FIG. 11B.

Moreover, the measurement data displayed by the GUI 20 can be dynamically re-arranged in real-time in response to receiving drag-and-drop input from a user. For instance, user's mouse, finger, or other input device can be used to "drag-and-drop" the position of the columns 242 in real-time. Thus, a user can be afforded additional capability for customizing the machine view within the GUI 20.

In addition, the GUI 20 can display a diagram 244 of the selected machine train in response to the selection of the machine train. The machine train diagram 244 can depict how the one or more machines 248 are coupled to each other within the selected machine train. As explained above, the visualizations representing the machines 248 can be selectable objects with which a user of the condition monitoring system 12 can interact via the dynamic GUI 20. In one embodiment, a user of the GUI 20 can select a machine 248 depicted in the machine train diagram 244, and the GUI 20 can then dynamically update various processing or analysis tools currently being displayed based on data that corresponds to the particular machine 248 associated with the selected visualization.

In one example, the GUI 20 can display the measurement data at a position in relation to the machine train diagram 244 based on the measured components' hierarchical relationship to other components within the selected machine train. For instance, a machine train hierarchy can be predefined with a machine train at the top of the hierarchy, followed by one or more machines within the machine train, then by one or more shafts within the one or more machines, then by one or more bearings within the one or more shafts. It should be noted the predefined machine train hierarchy is not limited thereto.

Accordingly, when the measurement data is grouped by machine in response to a selection of the "group by machine" grouping mode, as shown in FIG. 11A, the GUI 20 can display any measurement data corresponding to the machines 248, or other components below the machines 248 according to the predefined machine train hierarchy, beneath the machine train diagram 244. Likewise, when the measurement data is grouped by bearing in response to a selection of the "group by bearing" grouping mode, as shown in FIG. 11B, the GUI 20 can display any measurement data corresponding to the bearings 262, or other components below the bearings 262 according to the predefined machine train hierarchy, beneath the machine train diagram 244.

On the other hand, the GUI 20 can display one or more additional measurements 264 associated with the selected machine train, along with one or more sensors 18 from which the one or more additional measurements 264 derive, where the additional measurements 264 are above the plurality of measurements 254 according to the predefined machine train hierarchy. The one or more additional measurements 264 and the one or more sensors 18 from which they derive can be displayed above the machine train diagram 244, thus depicting the hierarchy of the selected machine train. Like the plurality of measurements 254, which can be displayed beneath the machine train diagram 244, the one or more additional measurements 264 can be automatically arranged in one or more columns to group measurement data associated with a common component.

For example, when the measurement data is grouped by machine in response to a selection of the "group by machine" grouping mode, as shown in FIG. 11A, the GUI 20 can display measurement data corresponding to the machine train 246 above the machine train diagram 244 with the selected machine train being above the machines 248 according to the predefined machine train hierarchy. Here, the machine train measurement data 246, which can be displayed above the machine train diagram 244, and thus above the machine measurement data 248, can indicate that the "Steam Turbine" is operating in a "Running" state.

In another example, when the measurement data is grouped by bearing in response to a selection of the "group by bearing" grouping mode, as shown in FIG. 11B, the GUI 20 can display measurement data corresponding to the machine train 246 and/or the machines 248 above the machine train diagram 244 with the selected machine train and the machines included therein being above the bearings 262 according to the predefined machine train hierarchy. Here, the machine train measurement data 246, which can be displayed above the machine train diagram 244, and thus above the bearing measurement data 262, can indicate that the "Steam Turbine" is operating in a "Running" state. Similarly, the machine measurement data 248, which can be displayed above the machine train diagram 244, and thus above the bearing measurement data 262, can include machines of the "Steam Turbine" machine train, as well as measurement data thereof.

Additionally, the GUI 20 can display a condition indicator 256 ("first condition indicator") in association with each of the measurements 254 and a condition indicator 258 ("second condition indicator") in association with each of the components (e.g., machines 248, bearings 262, etc.). In detail, the processor 26 can compare the plurality of measurements 254 with one or more predefined threshold values to determine a condition of said measurement. For example, the threshold values can be set to define various levels of operation, such as "normal," "alert," and "danger." Based on the comparison, the condition indicator 256 can be displayed adjacent to the corresponding measurement 254 to reflect the condition thereof.

The GUI 20 can also display a condition indicator 258 ("second condition indicator") in association with each of the components (e.g., machines 248, sensors 252, bearings 262, etc.). In this regard, the processor 26 can determine a condition of a particular component within the particular machine train based on the comparison of the plurality of measurements 254 with the one or more predefined threshold values. For instance, if all of the measurements 254 associated with a particular sensor 252 are at a "normal" level, based on the comparison, the condition indicator 258 can be displayed adjacent to the sensor 252 to depict a "normal" condition thereof. However, if one or more measurements 254 associated with the particular sensor 252 are at a "danger" level, based on the comparison, the condition indicator 258 can be displayed adjacent to the sensor 252 to depict a "danger" condition thereof.

The condition indicators 256 and 258 can include any suitable visual representation such as colors, shadings, labels, or the like. For example, the condition indicators 256 and 258 can be one of a plurality of colors, e.g., green, yellow, and red, indicating various levels of operation, such as "normal," "alert," and "danger." As shown in FIGS. 11A and 11B, the GUI 20 can display the condition indicators 256 and 258 adjacent to a corresponding measurement or component of the selected machine train.

In addition to grouping measurement data according to the selected input, the GUI 20 can also provide an option for users to dynamically present the data analysis workspaces 46 according to a certain order. Keeping this in mind and referring briefly back to FIGS. 6A-6B, the eight data analysis workspaces 46 depicted in FIGS. 6A and 6B can be initially ordered according to a measurement point ordering mode, which can have been selected by the user. That is, each of the measurement points associated with the eight data analysis workspaces 46 depicted in FIGS. 6A and 6B can be displayed according to some order. In one embodiment, the order can be associated with a hierarchical structure depicted in the hierarchical view space 52. As such, each measurement point can be associated with some order value, and the GUI 20 can display each of the eight data analysis workspaces 46 according to the respective order values of the measurement points depicted in each of the eight data analysis workspaces 46.

In certain embodiments, as additional data analysis workspaces 46 are generated, the GUI 20 can continue to display the newly generated data analysis workspaces 46 according the order of the measurement values. For instance, FIGS. 8A-8D depict schematic views 150, 160, 170, and 180 that include the eight data analysis workspaces 46 of FIGS. 6A and 6B along with additional data analysis workspaces 46 generated based on a user input. In particular, FIGS. 8A-8D include trend plots as depicted in FIGS. 6A and 6B and orbit-timebase plots associated with the Disp Wf (displacement waveform) measurement type 152, which can have been selected by the user. Here, each orbit-timebase plot depicts data associated with two measurement points that correspond to the immediately preceding trend plot. As such, each data analysis workspace 46 can be organized or ordered with respect to the measurement points. That is, since the trend plots of FIGS. 6A and 6B are grouped by bearings, each orbit-timebase plot following a trend plot includes data associated with the same bearing as the immediately preceding trend plot. In this manner, a user can evaluate the data analysis workspaces 46 for the same measurement points together to gain a more comprehensive understanding of the data. As such, the user can receive a more complete representation of a machine state.

Figure 9:
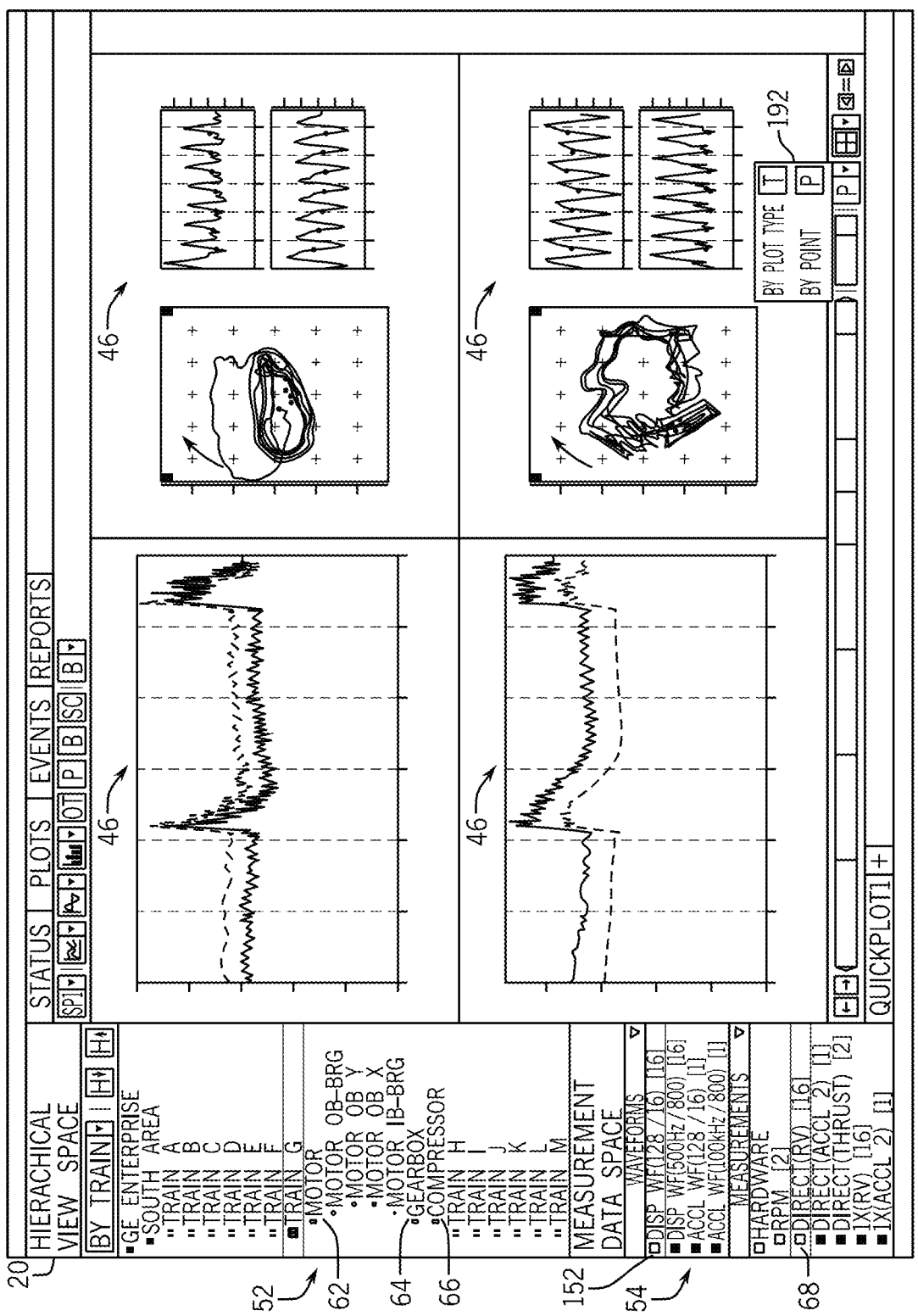
FIG. 9 illustrates a schematic view of a visualization providing an option to change an order mode for the plots of FIGS. 8A-8D, in accordance with embodiments presented herein.
Figure 10A:
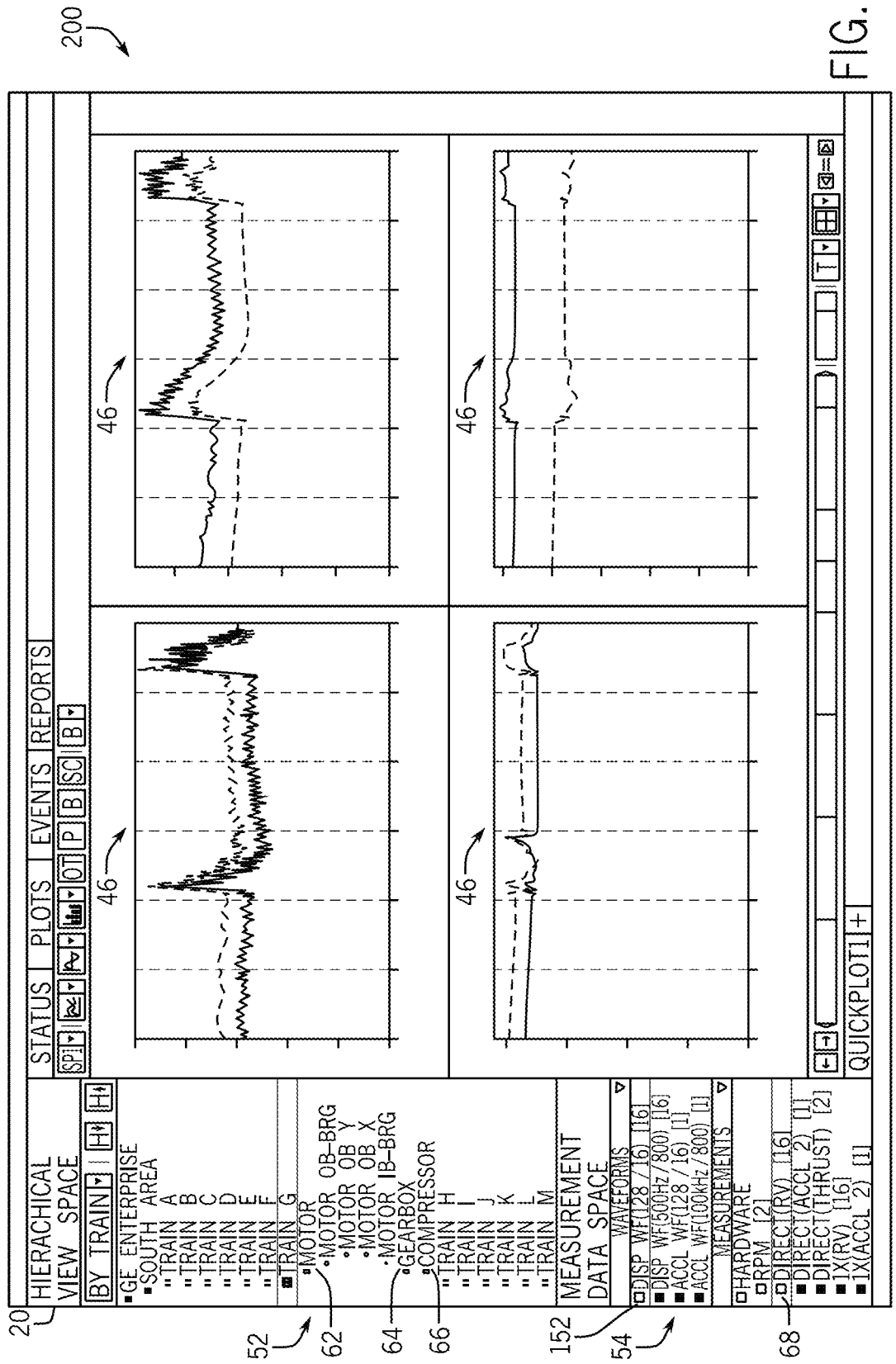
FIGS. 10A-10D illustrate schematic views of the plots of FIGS. 4A-4D along with the additional plots of FIGS. 8A-8D depicted according to a second order mode, in accordance with embodiments presented herein.
Figure 10B:
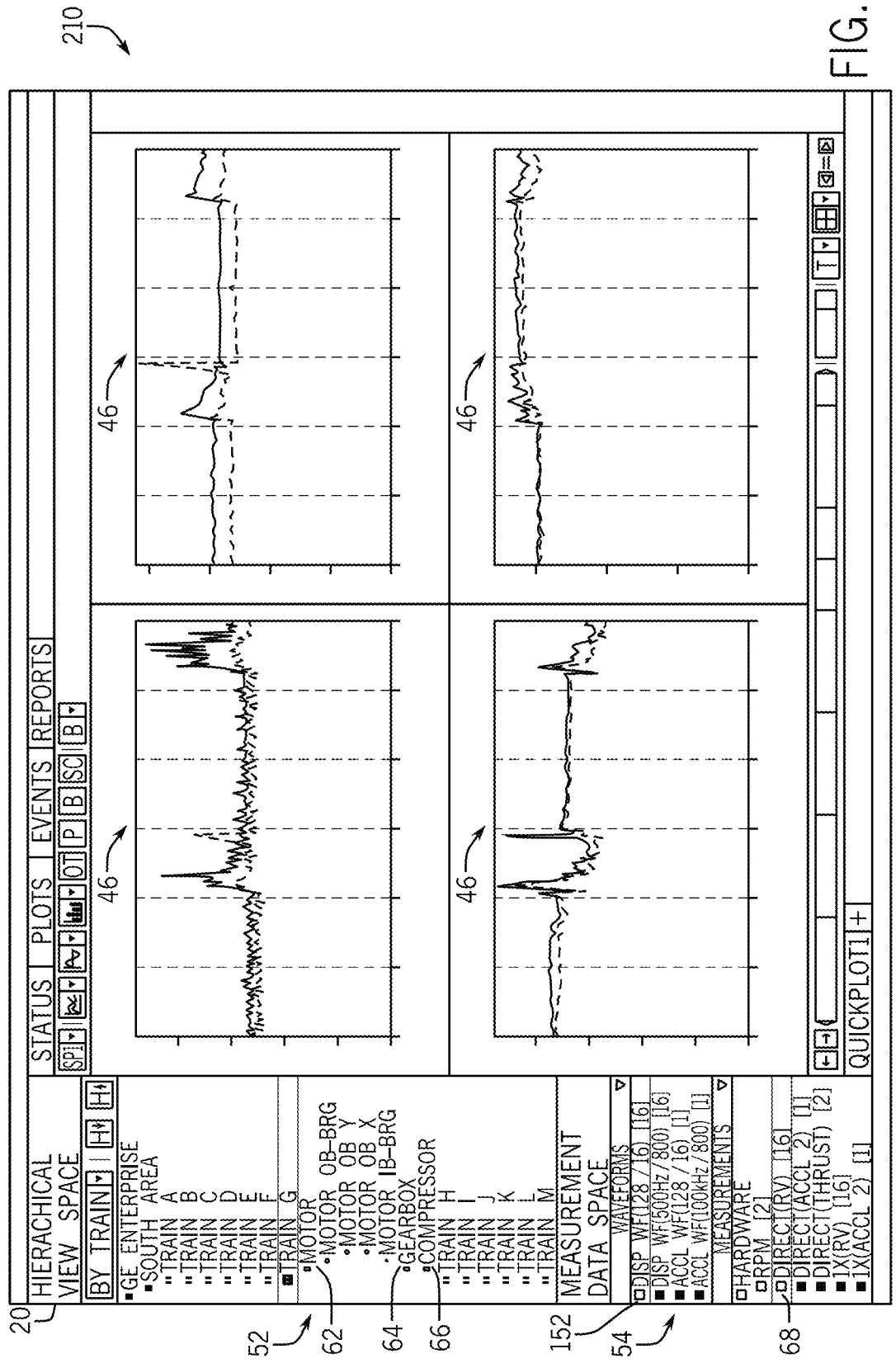
Figure 10C:
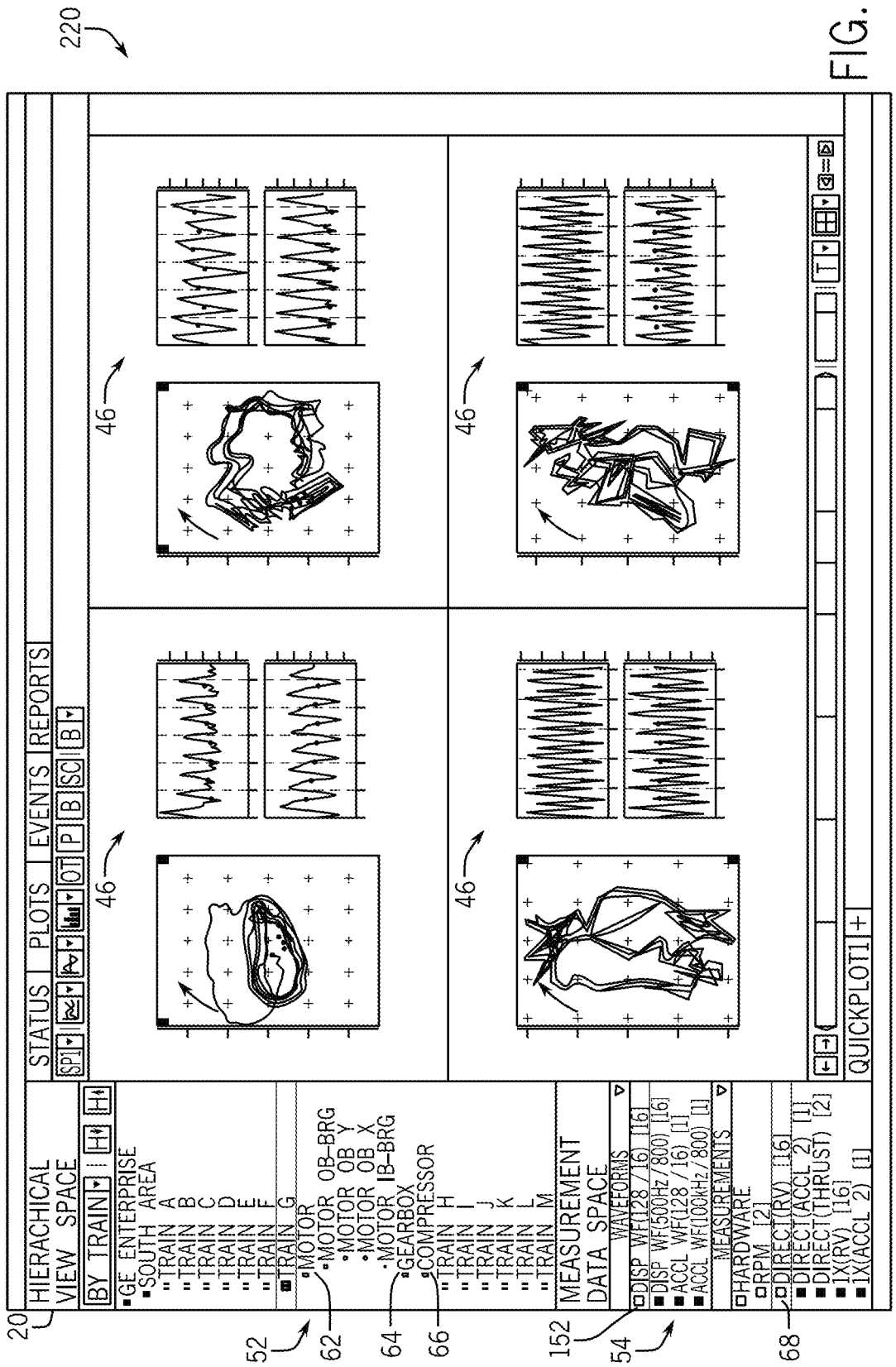
Figure 10D:
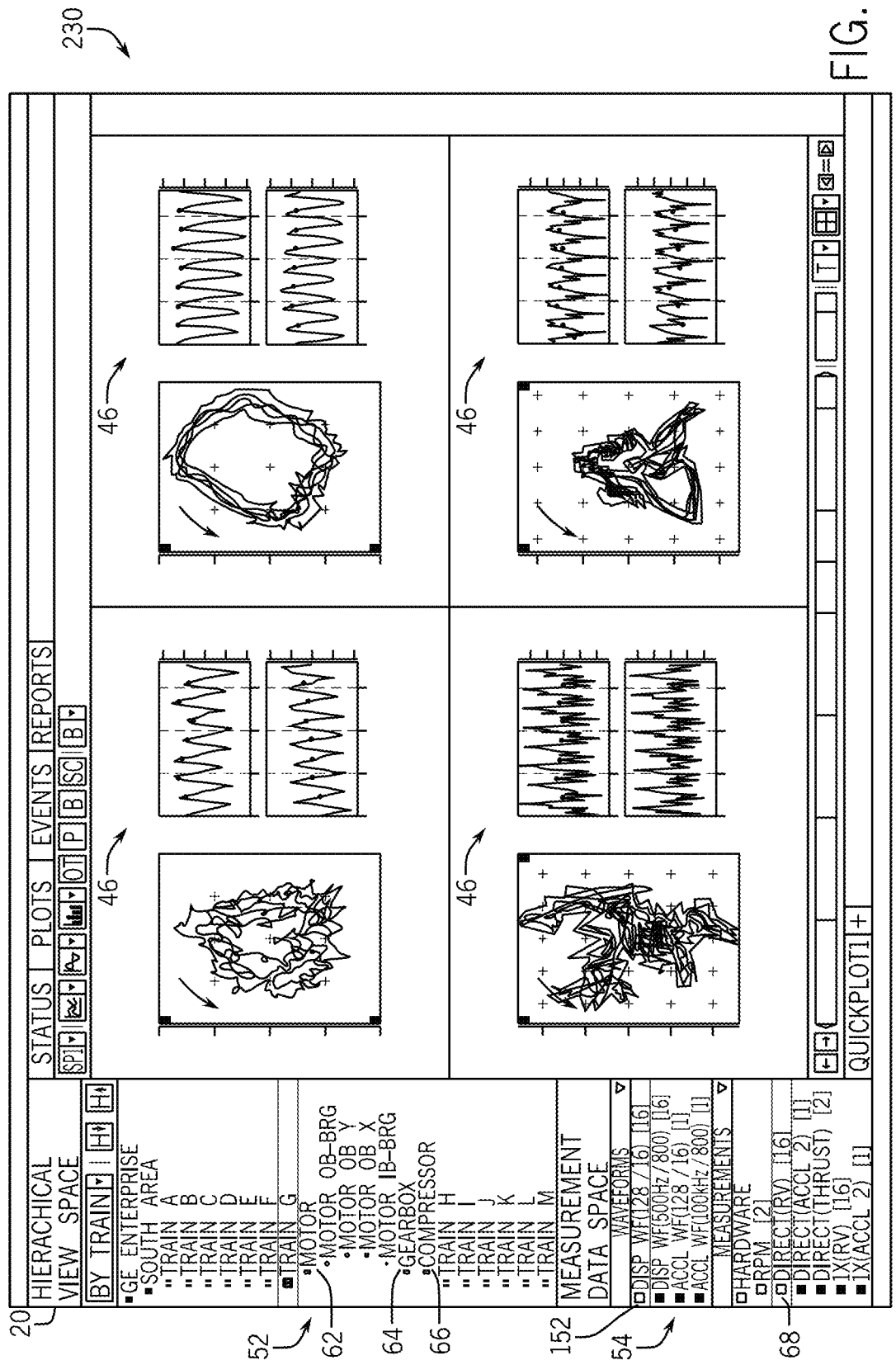

After the GUI 20 displays the data analysis workspaces 46 according to a first order, the GUI 20 can receive an input requesting that the currently displayed data analysis workspaces 46 be ordered according to a different mode. FIG. 9 illustrates a schematic view 190 of the data analysis workspaces 46 and a visualization 192 that provides options for displaying the data analysis workspaces 46 according to a particular order mode. As shown in FIG. 9, the visualization 192 provides an option to change the order mode in which the data analysis workspaces 46 can be ordered in the GUI 20. In one embodiment, the visualization 192 can include an option to order the data analysis workspaces 46 by plot type and an option to order the data analysis workspaces 46 by measurement points. As discussed above, ordering the data analysis workspaces 46 by measurement points can cause the GUI 20 to display the data analysis workspaces 46 according to an order that corresponds to the order values of the measurement points depicted in each data analysis workspace 46.

In addition to ordering the data analysis workspaces 46 by measurement points, the GUI 20 can order the data analysis workspaces 46 by plot type or data analysis type. That is, when the user selects to order the displayed data analysis workspaces 46 by plot type via the visualization 192, the GUI 20 can display the data analysis workspaces 46, such that each similar type of data analysis workspace 46 is displayed together.

Keeping the foregoing in mind, FIGS. 10A-10D illustrate schematic views 200, 210, 220, and 230 that depict the data analysis workspaces 46 of FIGS. 8A-8D ordered according to plot type. As such, schematic views 200 and 210 include data analysis workspaces 46 that correspond to the trend plots, and the schematic views 220 and 230 then include data analysis workspaces 46 that correspond to the orbit-timebase plots. As a result, the data analysis workspaces 46 are ordered by plot type. In this manner, a user can evaluate the data analysis workspaces 46 for the same plot type together to easily compare and contrast data across measurement points.

Technical effects of the embodiments presented in this disclosure include providing a user of the condition monitoring system 12 to group measurement points or measurement types on different plots, graphs, or other data analysis visualizations. That is, the data analysis visualizations provided by the condition monitoring system 12 can be grouped, for example, by machine, bearing, measurement point, or measurement type. As a result, the user can use this tool to both dictate how data analysis visualizations (e.g., plots) can be created in a data analysis workspace and to dynamically re-group measurement points or types on data analysis visualizations within the workspace in real-time.

By enabling a single data analysis workspace 46 to display multiple curves (e.g., stacked, overlaid) associated with different measurement points, the condition monitoring system 12 can enable the user to efficiently control how curves are grouped on the respective data analysis workspaces 46, and in turn, can reduce a number of data analysis workspaces 46 that can be created. As a result of displaying data analysis trends using fewer data analysis workspaces 46, the user can more efficiently and effectively group related measurement data together, thereby allowing the user to more easily perform data comparisons and obtain a broader understanding of a machine state.

Technical effects of the embodiments presented in this disclosure also include providing the user of the condition monitoring system 12 an efficient manner in which to alter the order of the data analysis workspaces 46. That is, by enabling the GUI 20 to display data analysis workspaces 46 to dynamically alter the order of the displayed data analysis workspaces 46, the GUI 20 can enable the user to view different presentations of related data associated with the same measurement points together.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a plurality of sensors disposed on a plurality of machine trains or one or more components within the plurality of machine trains, each machine train including one or more machines configured in an industrial environment; and
a computing device including
a communication circuit operatively coupled to the plurality of sensors and configured to communicate data measured by the plurality of sensors;
a touchscreen display providing a dynamic graphical user interface (GUI) configured to dynamically generate one or more visualizations of the measured data; and
a processor configured to receive the measured data via the communication circuit, to generate a plurality of measurements based on the measured data, and to operatively control the dynamic GUI so as to:

display a plurality of selectable objects corresponding to the plurality of machine trains as a graphical illustration depicting a physical arrangement of one or more machines included in at least one machine train of the plurality of machine trains;

receive a selection of one of the plurality of selectable objects, the selection corresponding to a particular machine included in at least one machine train of the plurality of machine trains;

receive a selection of a grouping mode among a plurality of predefined grouping modes specifying a machine train metric by which to group the measured data for display;

display a first plurality of measurements corresponding to the measured data associated with the particular machine train from which the plurality of measurements derive in the dynamic GUI above the graphical illustration depicting the physical arrangement of the one or more machines; and display a second plurality of measurements corresponding to the one or more machines of the particular machine train in the dynamic GUI below the graphical illustration depicting the physical arrangement of the one or more machines, the first plurality of measurements and the second plurality of measurements being automatically grouped into one or more columns in response to the selection of the grouping mode, wherein each measurement of the first plurality of measurements and the second plurality of measurements derives from a particular sensor among the plurality of sensors disposed on the particular machine train or on the one or more machines of the particular machine train.

2. The system of claim 1, wherein each column includes a list of one or more sensors among the plurality of sensors disposed on a particular component within the particular machine train, the particular component determined according to the specified machine train metric.

3. The system of claim 2, wherein each column further includes a list of one or more measurements among the plurality of measurements deriving from the one or more sensors, each of the one or more measurements being grouped with a particular sensor from which the measurement is derived.

4. The system of claim 3, wherein each column further includes at least one sensor with which a plurality of measurements are grouped.

5. The system of claim 1, wherein each column corresponds to one of a plurality of components within the particular machine train determined according to the specified machine train metric.

6. The system of claim 1, wherein the processor is further configured to compare the plurality of measurements with one or more predefined threshold values, and to operatively control the dynamic GUI so as to display a first condition indicator in association with each of the plurality of measurements according to the comparison of the plurality of measurements with one or more predefined threshold values.

7. The system of claim 6, wherein the processor is further configured to determine a condition of a particular component within the particular machine train based on the comparison of the plurality of measurements with one or more predefined threshold values, and to operatively control the dynamic GUI so as to display a second condition indicator in association with the particular component according to the determined condition.

8. The system of claim 7, wherein each of the first and second condition indicators is one of a plurality of colors indicating a condition of a corresponding measurement or component.

9. The system of claim 1, wherein the processor is further configured to operatively control the dynamic GUI so as to rearrange the one or more columns in response to receiving drag-and-drop input.

10. The system of claim 1, wherein the processor is further configured to operatively control the dynamic GUI so as to display one or more additional measurements corresponding to the measured data associated with the particular machine train and one or more sensors from which the one or more additional measurements derive, the one or more additional measurements being above the plurality of measurements according to a predefined machine train hierarchy.

11. The system of claim 10, wherein the one or more additional measurements and the one or more sensors from which the one or more additional measurements derive are automatically grouped into one or more columns in response to the selection of the grouping mode.

12. The system of claim 1, wherein responsive to receiving the selection of one of the plurality of selectable objects, the processor is further configured to operatively control the dynamic GUI to dynamically update an analysis tool being displayed in at least one workspace of the one or more workspaces provided in the dynamic GUI based on measured data corresponding to a machine associated with the one of the plurality of selectable objects.

13. The system of claim 1, wherein the computing device includes one of an industrial monitor, a workstation, a portable monitoring device, a smart phone device.

14. The system of claim 13, wherein the processor is further configured to operatively control the dynamic GUI so as to display one or more additional measurements corresponding to the measured data associated with the particular machine train and one or more sensors from which the one or more additional measurements derive, the one or more additional measurements being above the plurality of measurements according to a predefined machine train hierarchy, and the one or more additional measurements and the one or more sensors being displayed above the diagram of the particular machine train.

15. The system of claim 1, wherein the plurality of predefined grouping modes comprise at least two of: grouping by a particular machine, grouping by a particular bearing, grouping by a measurement point, and grouping by a measurement.

16. The system of claim 1, wherein the industrial environment includes one of an oil refinery, a manufacturing facility, a turbomachine system, a power generation system, a gasification system, a chemical production system, a gas turbine system, a steam turbine system, a combined cycle system, or a power plant.

17. The system of claim 1, wherein the plurality of machine trains comprise at least two of: a gasifier, a gas treatment unit, a machine, a motor, a gas turbine, a heat exchanger, a pump, a compressor, a fan, a generator, a steam turbine, a wind turbine, and piping.

18. The system of claim 1, wherein the plurality of sensors comprise: temperature sensors, current sensors, voltage sensors, pressure sensors, displacement sensors, vibration sensors, velocity sensors, acceleration sensors, torque sensors, flow sensors, clearance sensors, gas composition sensors, speed sensors, emissions sensors, or any combination thereof.

19. A non-transitory computer-readable medium comprising machine-readable instructions executable by a processor, wherein the machine-readable instructions are configured to cause the processor to:
receive, via a communication circuit coupled to the processor, data measured by a plurality of sensors, wherein the plurality of sensors are disposed on a plurality of machine trains or one or more components within the plurality of machine trains, each machine train including one or more machines configured in an industrial environment and monitored by a condition monitoring system including the processor;
generate a plurality of measurements based on the measured data; and
operatively control a dynamic graphical user interface (GUI) configured to dynamically generate one or more visualization of the measured data, the dynamic GUI provided on a touchscreen display of the condition monitoring system, the dynamic GUI operatively controlled so as to:
display a plurality of selectable objects corresponding to the plurality of machine trains as a graphical illustration depicting a physical arrangement of one or more machines included in at least one machine train of the plurality of machine trains;
receive a selection of one of the plurality of selectable objects, the selection corresponding to a particular machine included in at least one machine train of the plurality of machine trains;
receive a selection of a grouping mode among a plurality of predefined grouping modes specifying a machine train metric by which to group the measured data for display;
display a first plurality of measurements corresponding to the measured data associated with the particular machine train from which the plurality of measurements derive in the dynamic GUI above the graphical illustration depicting the physical arrangement of the one or more machines; and
display a second plurality of measurements corresponding to the one or more machines of the particular machine train in the dynamic GUI below the graphical illustration depicting the physical arrangement of the one or more machines, the first plurality of measurements and the second plurality of measurements being automatically grouped into one or more columns in response to the selection of the grouping mode,
wherein each measurement of the first plurality of measurements and the second plurality of measurements derives from a particular sensor among the plurality of sensors disposed on the particular machine train or on the one or more machines of the particular machine train.

20. A method, comprising:
receiving, by a processor configured in a condition monitoring system and coupled to a plurality of sensors via a communication circuit, data measured by the plurality of sensors, wherein the plurality of sensors are disposed on a plurality of machine trains or one or more components within the plurality of machine trains, each machine train including one or more machines configured in an industrial environment and monitored by the condition monitoring system;
generating, by the processor, a plurality of measurements based on the measured data; and
operatively controlling, by the processor, a dynamic graphical user interface (GUI) configured to dynamically generate one or more visualization of the measured data, the dynamic GUI provided on a touchscreen display of the condition monitoring system, the dynamic GUI operatively controlled so as to:
display a plurality of selectable objects corresponding to the plurality of machine trains as a graphical illustration depicting a physical arrangement of one or more machines included in at least one machine train of the plurality of machine trains;
receive a selection of one of the plurality of selectable objects, the selection corresponding to a particular machine included in at least one machine train of the plurality of machine trains;
receive a selection of a grouping mode among a plurality of predefined grouping modes specifying a machine train metric by which to group the measured data for display;
display a first plurality of measurements corresponding to the measured data associated with the particular machine train from which the plurality of measurements derive in the dynamic GUI above the graphical illustration depicting the physical arrangement of the one or more machines; and
display a second plurality of measurements corresponding to the one or more machines of the particular machine train in the dynamic GUI below the graphical illustration depicting the physical arrangement of the one or more machines, the first plurality of measurements and the second plurality of measurements being automatically grouped into one or more columns in response to the selection of the grouping mode,
wherein each measurement of the first plurality of measurements and the second plurality of measurements derives from a particular sensor among the plurality of sensors disposed on the particular machine train or the one or more machines of the particular machine train.

* * * * *